US010630436B2

United States Patent
Li et al.

(10) Patent No.: US 10,630,436 B2
(45) Date of Patent: Apr. 21, 2020

(54) SHORT TRANSMISSION TIME INTERVALS IN TIME DIVISION DUPLEX DOWNLINK AND UPLINK SUBFRAMES

(71) Applicant: Telefonaktiebolaget LM Ericsson (publ), Stockholm (SE)

(72) Inventors: Jingya Li, Göteborg (SE); Niklas Andgart, Södra Sandby (SE); Henrik Sahlin, Mölnlycke (SE); Gustav Wikström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/075,434

(22) PCT Filed: Mar. 8, 2017

(86) PCT No.: PCT/SE2017/050214

§ 371 (c)(1),
(2) Date: Aug. 3, 2018

(87) PCT Pub. No.: WO2017/155454

PCT Pub. Date: Sep. 14, 2017

(65) Prior Publication Data

US 2019/0044675 A1 Feb. 7, 2019

Related U.S. Application Data

(60) Provisional application No. 62/306,235, filed on Mar. 10, 2016.

(51) Int. Cl.
*H04L 5/00* (2006.01)
*H04L 5/14* (2006.01)
(Continued)

(52) U.S. Cl.
CPC ........ *H04L 5/0044* (2013.01); *H04J 11/0076* (2013.01); *H04L 5/1469* (2013.01); *H04L 27/2607* (2013.01); *H04W 72/0446* (2013.01)

(58) Field of Classification Search
CPC .......................... H04W 72/0446; H04W 72/04
See application file for complete search history.

(56) References Cited

U.S. PATENT DOCUMENTS 10,367,621 B2 * 7/2019 Jiang ..................... H04L 5/0055
2012/0135773 A1 5/2012 Shen et al.
(Continued)

OTHER PUBLICATIONS

International Search Report and Written Opinion dated May 24, 2017 for International Application No. PCT/SE2017/050214 filed Mar. 8, 2017, consisting of 11-pages.
(Continued)

*Primary Examiner* — Ayaz R Sheikh
*Assistant Examiner* — Debebe A Asefa
(74) *Attorney, Agent, or Firm* — Sage Patent Group

(57) ABSTRACT

Methods, wireless devices and network nodes for communicating in a wireless communication network are disclosed. According to one aspect, a wireless device includes processing circuitry configured to obtain information regarding the inclusion of at least one short transmission time interval, sTTI, in one of a time division duplex, TDD, uplink, UL, subframe and TDD downlink, DL, subframe of a radio frame. The wireless device further includes a transceiver configured to communicate with the network node using the at least one sTTI during the TDD subframe.

31 Claims, 13 Drawing Sheets

(51) Int. Cl.
*H04J 11/00* (2006.01)
*H04L 27/26* (2006.01)
*H04W 72/04* (2009.01)

(56) References Cited

U.S. PATENT DOCUMENTS

2016/0119948 A1* 4/2016 Damnjanovic ....... H04L 5/0094
                                                            370/280
2017/0188340 A1* 6/2017 Andgart ................ H04L 5/0044

OTHER PUBLICATIONS

3GPP TS 36.211 V13.0.0 3rd Generation Partnership Project; Technical Specification Group Radio Access Network; Evolved Universal Terrestrial Radio Access (E-UTRA); Physical channels and modulation (Release 13); Dec. 2015, consisting of 141-pages.

3GPP TSG RAN WG1 #84 R1-160737; Title: System Analysis of DL TTI Shortening; Agenda Item: 7.3.4.2; Source: CATT; Document for: Discussion and Decision, Location and Date: Malta, Feb. 15-19, 2016, consisting of 7-pages.

3GPP TSG RAN WG1 #84 R1-160780; Title: Considerations on shorter TTI for TDD duplex mode; Agenda Item: 7.3.4.4; Source: Nokia Networks, Alcatel-Lucent, Alcatel-Lucent Shanghai Bell; Document for: Discussion and Decision, Location and Date: St Julian's Malta, Feb. 15-19, 2016, consisting of 4-pages.

Nokia Networks: "On required physical layer enhancements for TTI shortening", 3GPP TSG-RAN WG1 Meeting #83 Anaheim, USA, Nov. 15-22, 2015, R1-157294, XP051003491, Retrieved from the Internet: URL:http://www.3gpp.org/ftp/Meetings_3GPP_SYNC/RAN1/Docs/, pp. 1-4.

Huawei et al: "Overview of short TTI", 3GPP TSG RAN WGI Meeting #84 St Julian's, Malta, Feb. 15-19, 2016, R1-160291, XP051053631, Retrieved from the Internet: URL:http://www.3gpp.org/ftp/Meetings_3GPP_SYNC/RAN1/Docs/, 5 Pages.

European Office Action for Application No. EP 17712259.5 dated Sep. 10, 2019—5 Pages.

* cited by examiner

SHORT TRANSMISSION TIME INTERVALS IN TIME DIVISION DUPLEX DOWNLINK AND UPLINK SUBFRAMES

CROSS-REFERENCE TO RELATED APPLICATIONS

This application is a Submission Under 35 U.S.C. § 371 for U.S. National Stage Patent Application of International Application Number: PCT/SE2017/050214, filed Mar. 8, 2017 entitled "SHORT TRANSMISSION TIME INTERVALS IN TIME DIVISION DUPLEX DOWNLINK AND UPLINK SUBFRAMES," which claims priority to U.S. Provisional Application No. 62/306,235, filed Mar. 10, 2016, entitled "SHORT TRANSMISSION TIME INTERVALS IN TIME DIVISION DUPLEX DOWNLINK AND UPLINK SUBFRAMES," the entireties of both of which are incorporated herein by reference.

TECHNICAL FIELD

This disclosure relates to wireless communication and in particular, to the use of short transmission time intervals (sTTIs) on time division duplex (TDD) downlink (DL) and uplink (UL) subframes.

BACKGROUND

A new available large spectrum block for fourth generation (4G) evolution radio systems and fifth generation (5G) radio systems is expected to be taken from a higher frequency band (e.g. above third generation (3G) radio systems) with most of the available spectrum unpaired. Time division duplex (TDD is promising for spectrum in the higher frequency band due to no requirement for a paired frequency band, channel reciprocity for MIMO and cost-effectiveness. 4G evolution should aim to enable higher performance, such as higher data rate and lower latency, which requires continued improvement for TDD.

In the 3rd Generation Partnership Project (3GPP) standard TS 36.211, three radio frame structures are supported. Frame structure type 1 (FS 1) is applicable to frequency division duplex (FDD) only, frame structure type 2 (FS 2) is applicable to time division duplex (TDD) only, and frame structure type 3 (FS 3) is applicable to licensed assisted access (LAA) secondary cell operation only.

With FS 2 for TDD, each radio frame of length 10 milliseconds (ms) consists of two half-frames of length 5 ms each. Each half-frame consists of five subframes (SFs) of length 1 ms. Each subframe (SF) is defined by two slots of length 0.5 ms each. Within each radio frame, a subset of SFs are reserved for uplink (UL) transmissions, and the remaining SFs are allocated for downlink (DL) transmissions, or for special SFs, where the switch between DL and UL occurs. Downlink refers to transmissions from a network node, such as a base station, to a wireless device, such as a mobile phone. Uplink refers to transmissions from the wireless device to the network node.

As shown in Table 1, from the third generation partnership project (3GPP) standard, 3GPP TS 36.211, version 13.0.0, seven different DL/UL configurations are supported for frame structure 2 (FS 2). In table 1, "D" denotes a DL SF, "U" denotes an UL SF, and "S" represents a special SF. Configurations 0, 1, 2, and 6 have 5 ms DL-to-UL switch-point periodicity, with the special SF existing in both SF 1 and SF 6. Configurations 3, 4 and 5 have 10 ms DL-to-UL switch-point periodicity, with the special SF in SF 1 only.

TABLE 1

| UL/DL configuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A special SF is split into three parts: a DL part (DwPTS), GP (Guard Period) and an UL part (UpPTS). The DwPTS with a duration of more than 3 symbols can be treated as a normal DL SF for data transmission. However, the UpPTS is not used for data transmission due to the very short duration. Instead, the UpPTS can be used for channel sounding or random access.

Typically, the DL/UL configuration and the configuration of the special SF used in a cell are signaled as part of the system information, which is included in system-information block 1 (SIB1) and broadcast every 80 ms within SF 5. The DL/UL configuration in a cell may vary between frames to adapt to the traffic needs. As can be seen in Table 1, SF 0 and SF 5 are always allocated for DL for all configurations.

Packet data latency is one of the performance metrics that vendors, operators and also end-users (via speed test applications) regularly measure. Latency measurements are done in all phases of a radio access network system lifetime, for example when verifying a new software release or system component, when deploying a system and when the system is in commercial operation. The latency is determined by several factors with two of them related to TDD frame structure, frame alignment and hybrid automated repeat request (HARQ) round trip time (RTT). An enhanced LTE-TDD frame structure can provide better frame alignment for shorter TTI and shorten the HARQ RTT.

Due to the existing frame structure design, the HARQ RTT is long in existing TDD systems, because downlink HARQ-ACK feedback can be performed only in an uplink subframe and uplink HARQ-ACK feedback can be performed only in a downlink subframe and DwPTS symbols of a special subframe.

Shorter latency than previous generations of 3GPP radio access technologies (RATs) was one performance metric that guided the design of Long Term Evolution (LTE). LTE is also now recognized by the end-users to be a system that provides faster access to the Internet and lower data latencies than previous generations of mobile radio technologies.

Packet data latency is important not only for the perceived responsiveness of the system; it is also a parameter that indirectly influences the throughput of the system. Hypertext transfer protocol/transfer control protocol (HTTP/TCP) is the dominating application and transport layer protocol suite used on the Internet today. According to the HTTP Archive (http://httparchive.org/trends.php), the typical size of HTTP based transactions over the Internet are in the range of a few 10's of kilo-bytes up to 1 megabyte. In this size range, the TCP slow start period is a significant part of the total transport period of the packet stream. During TCP slow start, the performance is latency limited. Hence, improved latency can improve the average throughput for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address concerning packet latency reductions is the reduction of transport time of data and control signaling, by addressing the length of a transmission time interval (TTI). In LTE release 8, a TTI corresponds to one SF of length 1 millisecond. One such 1 ms TTI is constructed by using 14 orthogonal frequency division multiplexing (OFDM) or single carrier-frequency division multiple access (SC-FDMA) symbols in the case of normal cyclic prefix and 12 OFDM or SC-FDMA symbols in the case of extended cyclic prefix (CP). In LTE release 13, a goal of specifying transmissions with shorter TTIs that are shorter than the LTE release 8 TTI is being studied. The short TTI can be decided to have any duration in time and comprise resources on a number of OFDM or SC-FDMA symbols within a 1 ms SF. As one example, the duration of the short TTI may be 0.5 ms, i.e. seven OFDM or SC-FDMA symbols for the case with normal cyclic prefix. Another example is a TTI of only two OFDM or SC-FDMA symbols.

Based on the existing FS 2, as given in 3GPP TS 36.211, UL data and control information is only allowed to be transmitted in the UL SF, and downlink transmission is only possible in the DL SF and DwPTS of the special subframe. Therefore, the delay for a granted UL data transmission will depend on when the next UL SF occurs, and the delay for a granted DL data transmission will depend on when the next DL SF or DwPTS occurs. The latency will thus depend on the frame alignment in TDD. The hybrid automated repeat request (HARQ) timing for UL and DL transmissions also depends on the DL/UL configurations, which in turn has an impact on HARQ round-trip-time (RTT).

Based on the existing FS 2, as provided in 3GPP TS 36.211, UL data and control information is only allowed to be transmitted in UL SF, and downlink transmission is only possible in DL SF and DwPTS. Therefore, the delay for a granted UL data transmission will depend on when the next UL SF occurs, and the delay for a granted DL data transmission will depend on when the next DL SF or DwPTS occurs. The latency will thus depend on the frame alignment in TDD. The HARQ timing for UL and DL transmissions also depends on the DL/UL configurations, which in turn has an impact on HARQ round-trip-time (RTT).

Based on the existing FS 2, the latency due to frame alignment and HARQ RTT for TDD is much longer than that for FDD. Even with shortened TTIs, the latency in TDD cannot be scaled linearly proportional to the TTI length, and it is limited to the additional waiting time due to the DL/UL configurations.

SUMMARY

Some embodiments advantageously provide methods, wireless devices and network nodes for communicating in a wireless communication network. According to one aspect, a wireless device includes processing circuitry configured to obtain information regarding the inclusion of at least one short transmission time interval, sTTI, in one of a time division duplex, TDD, uplink, UL, subframe and TDD downlink, DL, subframe of a radio frame. The wireless device further includes a transceiver configured to communicate with the network node using the at least one sTTI during the TDD subframe.

According to this aspect, in some embodiments, the TDD subframe is a TDD downlink subframe and transmission of uplink sTTIs in the TDD downlink subframe is performed only when no wireless devices not supporting sTTI transmissions are scheduled to transmit downlink in the TDD downlink subframe. In some embodiments, no uplink sTTIs are transmitted during symbols where the sTTI frequency band contains at least one resource block used for secondary synchronization signals, SSS. In some embodiments, the TDD downlink subframe is subframe 0 and no uplink sTTIs are transmitted in symbols where the sTTIs frequency band contains at least one resource block used for a broadcast channel, BCH. In some embodiments, the TDD downlink subframe is transmitted without cells specific reference symbols, CRS, and scheduling of uplink sTTIs in symbols 4, 7 and 11 are allowed. In some embodiments, the TDD subframe is a TDD uplink subframe and receiving of downlink sTTIs is only performed when no wireless devices not supporting sTTI transmission are scheduled to transmit on the uplink in the TDD uplink subframe. In some embodiments, the downlink sTTIs reuse a cell-specific reference symbol, CRS, pattern present in the TDD uplink subframe before the introduction of the sTTIs in the TDD subframe. In some embodiments, a guard period is removed by switching from downlink transmission to uplink transmission during the cyclic prefix of one symbol. In some embodiments, the processing circuitry further is further configured to allocate a guard period, GP, of the TDD subframe for switching from downlink signaling to uplink signaling. In some embodiments, the uplink transmissions occur during an sTTI having a duration of less than three symbols. In some embodiments, the downlink receptions occur during an sTTI having a duration of less than four symbols. In some embodiments, the TDD subframe is an uplink subframe and, when no other wireless device is scheduled for transmission during the TDD subframe, the uplink subframe is configured for downlink transmission during an sTTI having a duration not greater than two symbols. In some embodiments, the processing circuitry is further configured to form the TDD subframe having the sTTI.

According to another aspect, a method for use in a wireless device in a wireless communication network for communicating with at least one network node is provided. The method includes obtaining information regarding the inclusion of at least one short transmission time interval, sTTI, in one of a time division duplex, TDD, uplink, UL, subframe and downlink, DL, subframe of a radio frame. The method further includes communicating with the network node using the at least one sTTI during the TDD subframe.

According to this aspect, the TDD subframe is a TDD downlink subframe and transmission of uplink sTTIs in the TDD downlink subframe is performed only when no wireless devices not supporting sTTI transmissions are scheduled to transmit downlink in the TDD downlink subframe. In some embodiments, no uplink sTTIs are transmitted in symbols where the sTTI frequency band contains at least one resource block used for secondary synchronization signals, SSS. In some embodiments, the TDD downlink subframe is subframe 0 and no uplink sTTIs are transmitted in symbols where the sTTIs frequency band contains at least one resource block used for a broadcast channel, BCH. In some embodiments, the TDD downlink subframe is transmitted without cell-specific reference symbols, CRS, and transmissions of uplink sTTIs in symbols 4, 7 and 11 are allowed. In some embodiments, the TDD subframe is a TDD uplink subframe and receiving of downlink sTTIs is only performed when no wireless devices not supporting sTTI transmission are scheduled to transmit on the uplink in the TDD uplink subframe. In some embodiments, the downlink sTTIs reuse a cell-specific reference symbol, CRS, pattern present in the TDD uplink subframe before the introduction of the sTTIs in the TDD subframe. In some embodiments, a guard period is removed by switching from downlink transmission to uplink transmission during the cyclic prefix of one symbol. In some embodiments, the method further includes allocating a guard period, GP, of the TDD subframe for switching from downlink signaling to uplink signaling. In some embodiments, the TDD subframe is a downlink subframe configured to include at least one uplink sTTI. In some embodiments, the uplink transmissions occur during an sTTI having a duration less than three symbols. In some embodiments, the downlink receptions occur during an sTTI having a duration less than four symbols. In some embodiments, the TDD subframe is an uplink subframe and, when no other wireless device is scheduled for transmission during the TDD subframe, the uplink subframe is configured for downlink transmissions during an sTTI having a duration not greater than two symbols. In some embodiments, the method further includes forming the TDD subframe having the sTTI.

According to yet another aspect, a wireless device in a wireless communication network for communicating with a network node is provided. The wireless device includes a time division duplex, TDD, subframe module configured to obtain information regarding the inclusion of at least one short transmission time interval, sTTI, in one of a time division duplex, TDD, uplink, UL, subframe and downlink, DL, subframe of a radio frame. The wireless device also includes a transceiver module configured to communicate with the network node using the at least one sTTI during the TDD subframe.

According to another aspect, a network node for use in a wireless communication network for communicating with at least one wireless device is provided. The network node includes processing circuitry configured to schedule at least one of downlink transmissions and uplink transmissions during at least one short transmission time interval, sTTI, in a time division duplex, TDD, subframe. The network node also includes a transceiver configured to communicate with the at least one wireless device using the at least one sTTI during the TDD subframe.

According to this aspect, in some embodiments, the TDD subframe is a TDD downlink subframe and scheduling of uplink sTTIs in the TDD downlink subframe is performed only when no wireless devices not supporting sTTI transmissions are scheduled to transmit downlink in the TDD downlink subframe. In some embodiments, no uplink sTTIs are scheduled in symbols where the sTTI frequency band contains at least one resource block used for secondary synchronization signals, SSS. In some embodiments, the TDD downlink subframe is subframe 0 and no uplink sTTIs are scheduled in symbols where the sTTIs frequency band contains at least one resource block used for a broadcast channel, BCH. In some embodiments, the TDD downlink subframe is transmitted without cell-specific reference symbol, CRS, and scheduling of uplink sTTIs in symbols 4, 7 and 11 are allowed. In some embodiments, the TDD subframe is a TDD uplink subframe and scheduling of downlink sTTIs is only performed when no wireless devices not supporting sTTI transmission are scheduled to transmit on the uplink in the TDD uplink subframe. In some embodiments, the downlink sTTIs reuse a cell-specific reference symbol, CRS, pattern present in the TDD uplink subframe before the introduction of the sTTIs in the TDD subframe. In some embodiments, a guard period is removed by switching from downlink transmission to uplink transmission during the cyclic prefix of one symbol. In some embodiments, the processing circuitry is further configured to allocate a guard period, GP, of the TDD subframe for switching from a downlink sTTI to an uplink sTTI. In some embodiments, a symbol of the TDD subframe not allocated to a short TTI is allocated to a secondary synchronization signal, SSS. In some embodiments, the uplink transmissions occur during an sTTI having a duration less than three symbols. In some embodiments, the downlink transmissions occur during an sTTI having a duration less than four symbols. In some embodiments, the TDD subframe includes a first symbol allocated to physical downlink control channel, PDCCH, signaling. In some embodiments, scheduling the TDD subframe includes scheduling a broadcast channel, BCH, having a duration of no more than four symbols. In some embodiments, the TDD subframe is an uplink TDD subframe and the scheduling includes, when no wireless device not configured to transmit sTTI signaling is scheduled for transmission during the TDD subframe, scheduling at least one downlink sTTI having a duration not greater than two symbols.

According to another aspect, a method for use in a network node in a wireless communication network for communicating with at least one wireless device. The method includes scheduling at least one of downlink transmissions and uplink transmissions during at least one short transmission time interval, sTTI, in a time division duplex, TDD, subframe. The method includes communicating with the at least one wireless device using the at least one sTTI during the TDD subframe.

According to this aspect, in some embodiments, the TDD subframe is a TDD downlink subframe and scheduling of uplink sTTIs in the TDD downlink subframe is performed only when no wireless devices not supporting sTTI transmissions are scheduled to transmit downlink in the TDD downlink subframe. In some embodiments, no uplink sTTIs are scheduled in symbols where the sTTI frequency band contains at least one resource block used for secondary synchronization signals, SSS. In some embodiments, the TDD downlink subframe is subframe 0 and no uplink sTTIs are scheduled in symbols where the sTTIs frequency band contains at least one resource block used for a broadcast channel, BCH. In some embodiments, the TDD downlink subframe is transmitted without cell-specific reference symbols, CRS, and scheduling of uplink sTTIs in symbols 4, 7 and 11 are allowed. In some embodiments, the TDD subframe is a TDD uplink subframe and scheduling of downlink sTTIs is only performed when no wireless devices not supporting sTTI transmission are scheduled to transmit on the uplink in the TDD uplink subframe. In some embodiments, the downlink sTTIs reuse a cell-specific reference symbol, CRS, pattern present in the TDD subframe before the introduction of the sTTIs in the TDD uplink subframe. In some embodiments, a guard period is removed by switching from downlink transmission to uplink transmission during the cyclic prefix of one symbol. In some embodiments, the method further includes allocating a guard period, GP, of the TDD subframe for switching from a downlink sTTI to an uplink sTTI. In some embodiments, a symbol of the TDD subframe not allocated to a short TTI is allocated to a secondary synchronization signal, SSS. In some embodiments, the uplink transmissions occur during an sTTI having a duration less than three symbols. In some embodiments, the downlink transmissions occur during an sTTI having a duration less than four symbols. In some embodiments, the TDD subframe includes a first symbol allocated to physical downlink control channel, PDCCH, signaling. In some embodiments, scheduling the TDD subframe includes scheduling a broadcast channel, BCH, having a duration of no more than four symbols. In some embodiments, the TDD subframe is an uplink TDD subframe and the scheduling includes, when no wireless device not configured to transmit sTTI signaling is scheduled for transmission during the TDD subframe, scheduling at least one downlink sTTI having a duration not greater than two symbols.

According to yet another aspect, a network node for scheduling data signaling in a wireless communication network is provided. The network node includes a time division duplex, TDD, subframe scheduling module configured to schedule at least one of downlink transmissions and uplink transmissions during at least one short transmission time interval, sTTI, in a time division duplex, TDD, subframe. The network node further includes a transceiver module configured to communicate with the at least one wireless device using the at least one sTTI during the TDD subframe.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
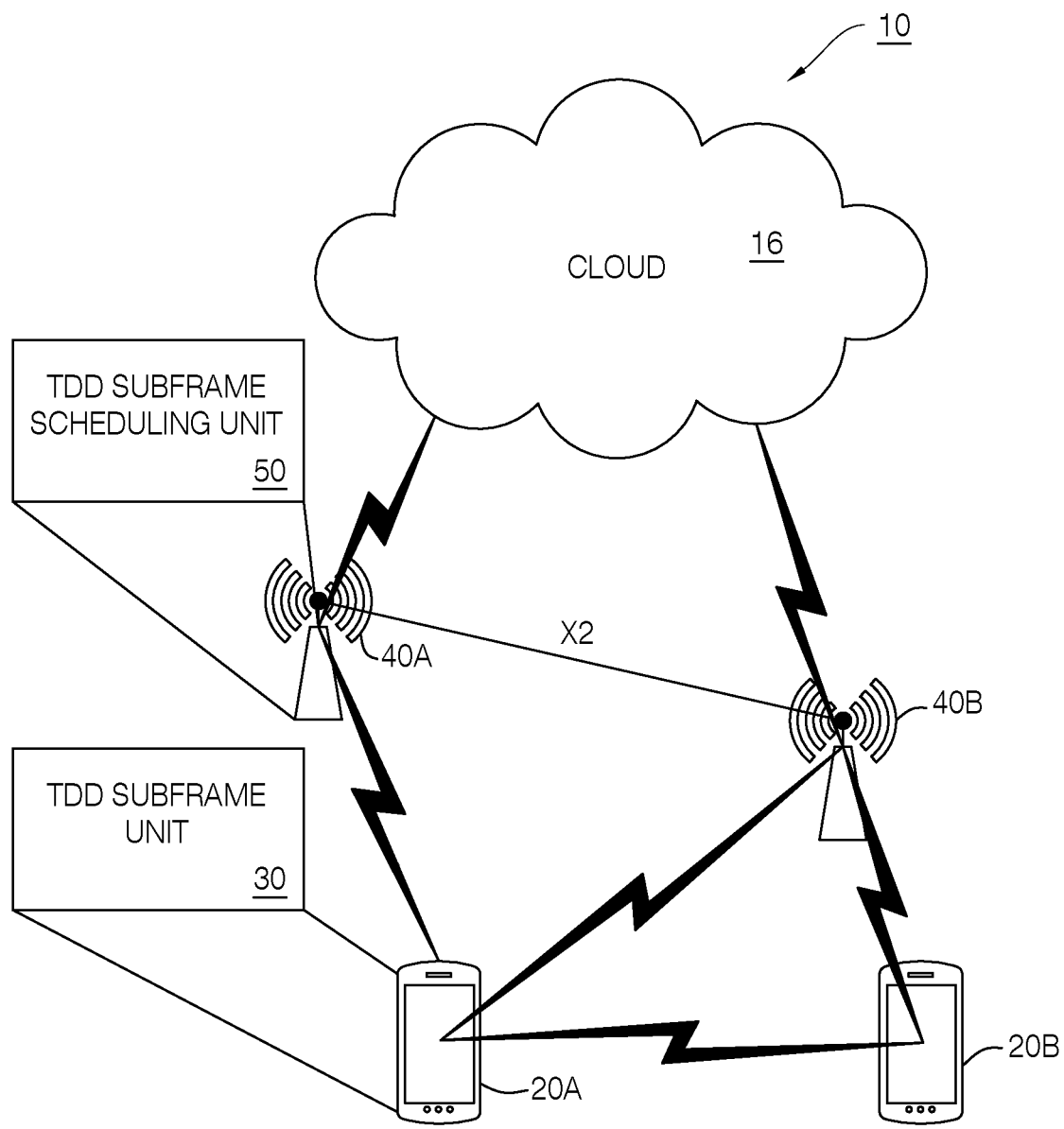
FIG. 1 is a block diagram of a wireless communication network constructed according to principles set forth herein.

Before describing in detail exemplary embodiments, it is noted that the embodiments reside primarily in combinations of apparatus components and processing steps related to introduction of short TTIs (sTTIs) on TDD DL and UL subframes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments provide for introduction of short TTIs on TDD DL and UL SFs. In particular, part of a DL SF can be used for UL short TTI transmissions, and part of a UL SF can be used for DL short TTI transmissions, without effecting legacy TDD wireless devices. The proposed solution allows both UL and DL short TTI transmissions in legacy DL and UL SFs, which provides latency reduction in frame alignment and HARQ RTT for TDD, without affecting legacy TDD subframes. As used herein, the term "legacy DL subframes" and "legacy UL subframes" refer to subframes that are not configured to include sTTIs. Similarly, the term "legacy WD" refers to a WD that transmits and receive subframes that are not configured to include sTTIs. An sTTI, as used hereafter, is an sTTI that has a duration less than the duration of a subframe. In LTE, embodiments of a subframe have 14 symbols (1 millisecond) duration and an sTTI has a duration of less than 14 symbols. In some embodiments, an sTTI has a duration of two symbols. A symbol is a duration of time in a subframe for transmitting or receiving a symbol, such as, for example, an OFDM symbol. In LTE, there are 14 successive symbols in a single subframe. The symbols referred to herein are time symbols with a certain time duration, such as for example OFDM symbols.

A general concept of the present disclosure is thus to introduce one or more short TTIs in a subframe (i.e., a legacy subframe not previously containing any sTTIs), wherein the sTTI(s) typically occupies one or more symbols. These sTTIs may be used for UL and/or DL transmissions of information such as data and control information. A method of introducing short TTIs on TDD DL SF will be described. The same methodology can also be used for introducing short TTIs on TDD UL SFs, which have much less constraints as compared to introducing short TTIs on TDD DL SFs.

The examples given below are not a complete set, and other combinations may be implemented. Some of the examples assume that the DL-to-UL switch includes at least one symbol guard period (GP), in order for the wireless device to be able to use timing advance. A GP is a period of time following a downlink transmission and preceding an uplink transmission. This makes the UL signals from different wireless devices arrive at the correct timing at the network node, e.g., base station, without creating interference to the DL transmission. It should be noted that the GP could potentially even be removed if the DL part is targeted to one wireless device and the UL comes from another wireless device, and where the UL wireless device is too far away from the DL wireless device to cause significant interference. As is described below, the removal of the GP gives more opportunities for introducing UL short TTIs in a TDD DL SF. As used herein, a downlink sTTI is an sTTI used to transmit from a network node or receive by a wireless device on the downlink. An uplink sTTI is an sTTI used to receive by a network node or transmit from a wireless device on the uplink.

Some examples assume that at least two symbol lengths of both DL and UL TTIs are used for data transmission. However, the length of the DL short TTI may be down to a single symbol length, while the length of the UL short TTI, if keeping the SC-FDMA modulation in UL, should have at least two symbols, with one symbol used for a demodulation reference signal (DMRS) and one symbol used for data. If OFDM modulation in the UL is used, the UL short TTIs could potentially also have single symbol lengths.

Referring now to the drawing figures in which like reference designators refer to like elements, FIG. 1 is a block diagram of a wireless communication network 10 constructed according to principles set forth herein. The wireless communication network 10 includes a cloud 16 which may include the Internet and/or the public switched telephone network (PSTN). Cloud 16 may also serve as a backhaul network of the wireless communication network 10. The wireless communication network 10 includes wireless devices 20A and 20B, referred to collectively herein as wireless devices 20. The wireless devices 20 are served by one or more network nodes 40A and 40B, referred to collectively as network nodes 40. Note that although only two wireless devices 20 and two network nodes 40 are shown for convenience, the wireless communication network 10 may typically include many more WDs 20 and network nodes 40.

A WD 20 may include processing circuitry to implement a TDD subframe unit 30. The TDD subframe unit 30 is configured to obtain information regarding the inclusion of at least, sTTI, in one of a TDD UL subframe and TDD DL subframe of a radio frame to create an sTTI-containing TDD subframe for at least one of UL transmissions and DL transmissions. Similarly, a network node 40 may include processing circuitry to implement a TDD subframe scheduling unit 50. The TDD subframe scheduling unit 50 is configured to schedule at least one of downlink transmissions and uplink transmissions during at least one sTTI in a TDD subframe to create an sTTI-containing TDD subframe.

The term wireless device or mobile terminal used herein may refer to any type of wireless device communicating with a network node 40 and/or with another wireless device 20 in a cellular or mobile communication system 10. Examples of a wireless device 20 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of network node in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Although embodiments are described herein with reference to certain functions being performed by network nodes 40, which may be base stations, it is understood that the functions can be performed in other network nodes and elements. It is also understood that the functions of the network nodes 40 can be distributed across network cloud 16 so that other nodes can perform one or more functions or even parts of functions described herein.

Figure 2:
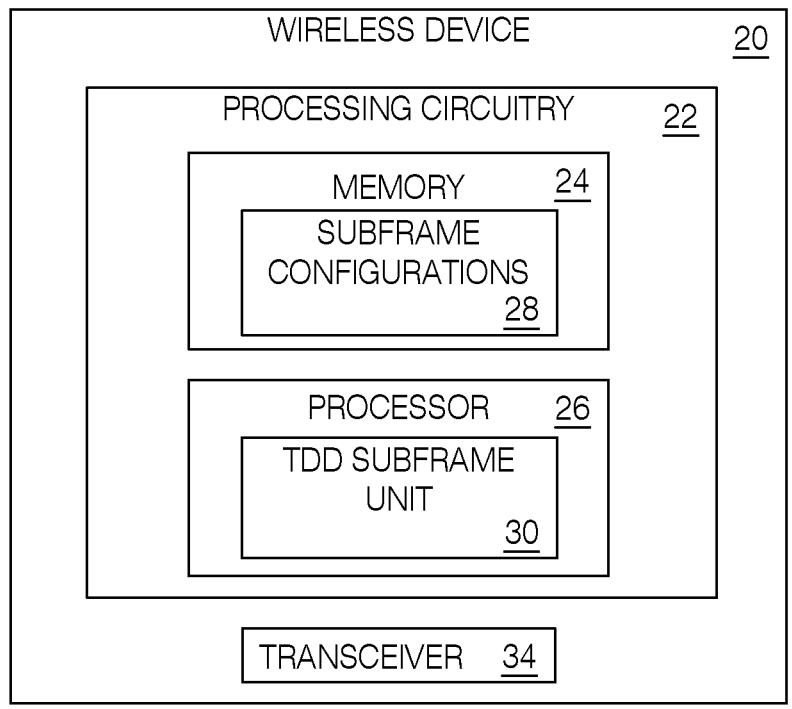
FIG. 2 is a block diagram of a wireless device (WD) constructed in accordance with principles set forth herein.

FIG. 2 is a block diagram of a WD 20 constructed in accordance with principles set forth herein. The WD 20 includes processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may include a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store subframe configurations 28 that are generated by a TDD subframe unit 30, as implemented by the processing circuitry 26 according to information obtained by a network node 40. The TDD subframe unit 30 is configured to obtain information regarding the inclusion of at least one sTTI in one of a TDD UL subframe and TDD DL subframe of a radio frame to create an sTTI-containing TDD subframe for at least one of UL transmissions and DL transmissions. A transceiver 34 is configured to communicate with a network node 40 using the at least one sTTI during the TDD subframe.

Figure 3:
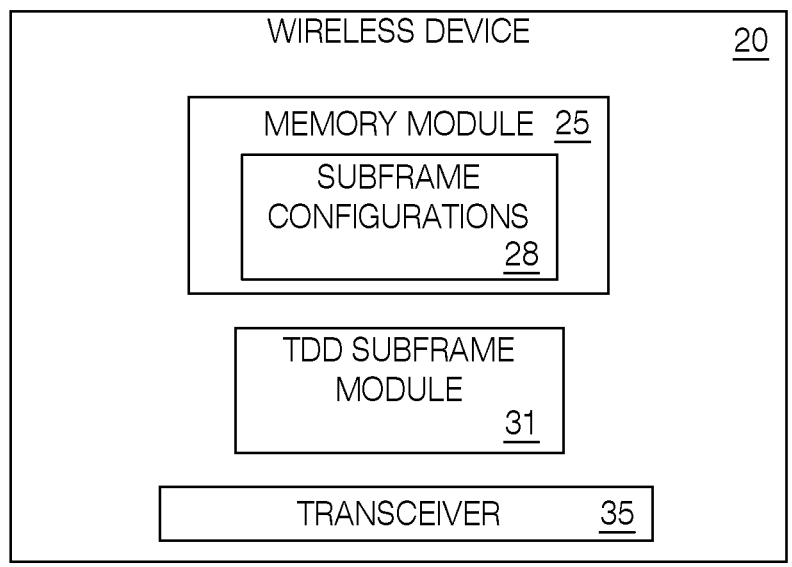
FIG. 3 is a block diagram of an alternative embodiment of WD that has modules that may be implemented at least in part in software.

FIG. 3 is a block diagram of an alternative embodiment of WD 20 that has modules that may be implemented at least in part in software. A memory module 25 is configured to store subframe configurations 28 configured according to information obtained from a network node 40. The TDD subframe module 31 is implemented in software that when executed by a processor causes the processor to obtain information regarding the inclusion of at least one sTTI in one of a TDD UL subframe and DL subframe of a radio frame to create an sTTI-containing TDD subframe for at least one of UL transmissions and DL transmissions. The transceiver 35, which may be implemented in part in software, is configured to communicate with a network node 40 using the at least one sTTI during the TDD subframe.

Figure 4:
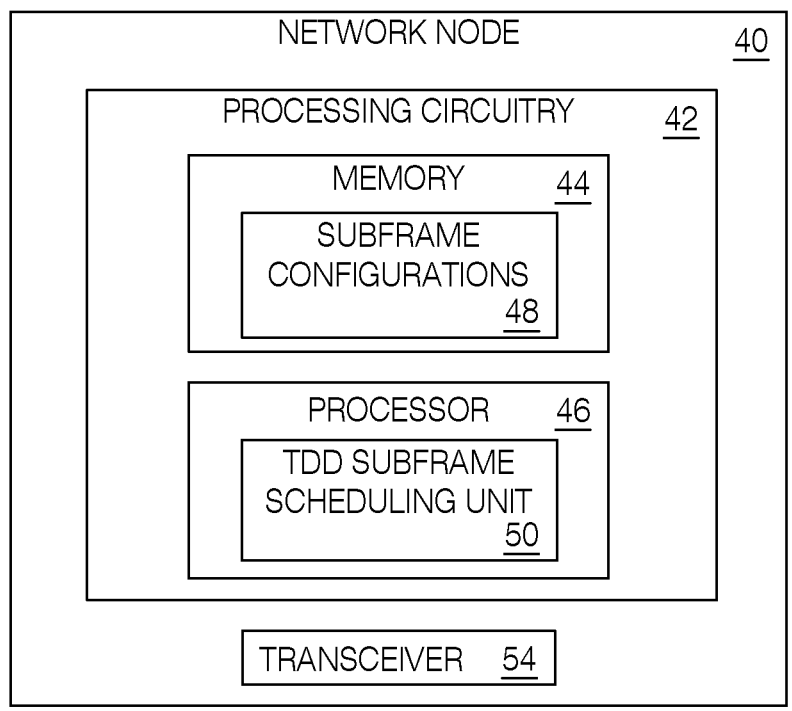
FIG. 4 is a block diagram of a network node constructed in accordance with principles set forth herein.

FIG. 4 is a block diagram of a network node 40 constructed in accordance with principles set forth herein. Network node 40 includes processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store subframe configurations 48 generated by TDD subframe scheduling unit 50 implemented by the processor 46. The TDD subframe scheduling unit 50 is configured to schedule at least one of downlink transmissions and uplink transmissions during at least one short transmission time interval, sTTI, in a time division duplex, TDD, subframe to create an sTTI-containing TDD subframe. A transceiver 54 is configured to communicate with the at least one wireless device 20 using the at least one sTTI during the TDD subframe.

Figure 5:
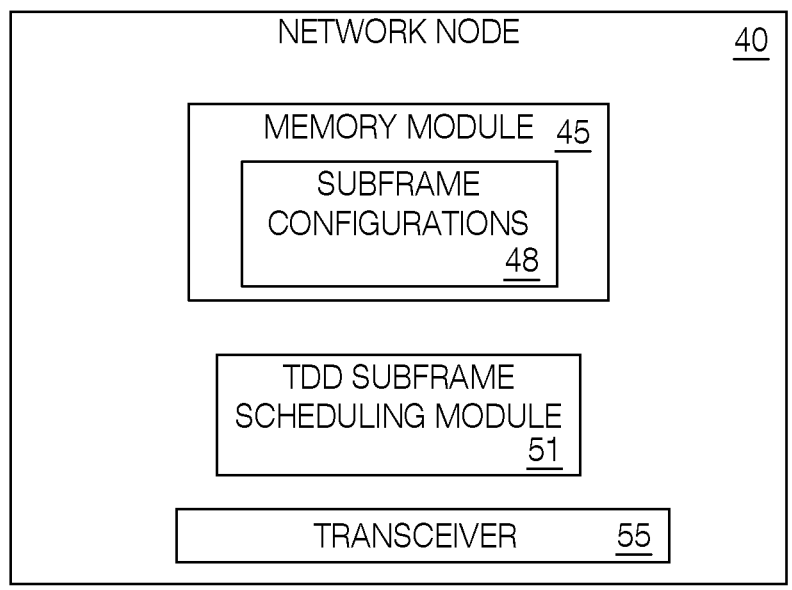
FIG. 5 is a block diagram of an alternative embodiment of the network node that has modules that may be implemented at least in part in software.

FIG. 5 is a block diagram of an alternative embodiment of the network node 40 that has modules that may be implemented at least in part in software. A memory module 45 is configured to store the subframe configurations 48 scheduled by the TDD subframe scheduling module 51. The transceiver 55 is configured to communicate with the at least one wireless device 20 using the at least one sTTI during the TDD subframe.

Figure 6:
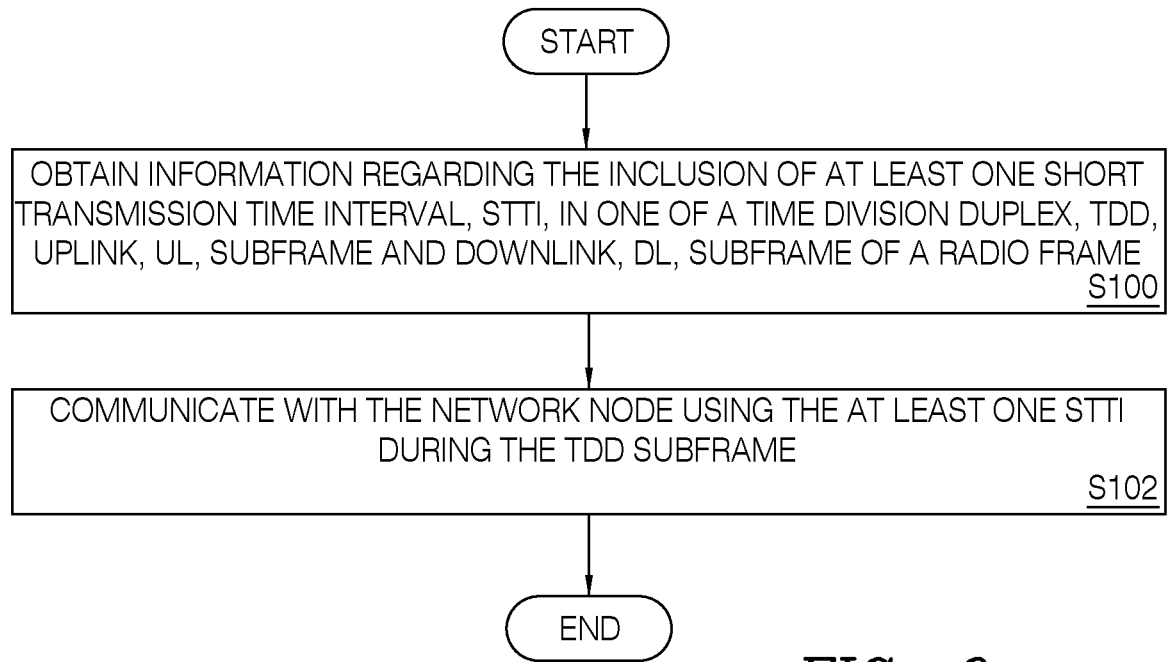
FIG. 6 is a flowchart of an exemplary process in a wireless device for communicating with a network node.

FIG. 6 is a flowchart of an exemplary process in a wireless device 20 for communicating with a network node 40. The process includes obtaining, via the TDD subframe unit 30, information regarding the inclusion of at least one sTTI in one of a TDD UL subframe and DL subframe of a radio frame to create an sTTI-containing TDD subframe for at least one of UL transmissions and DL transmissions (s100). The process also includes communicating, via the transceiver 34, with the network node 40 using the at least one sTTI during the TDD subframe (block S102).

Figure 7:
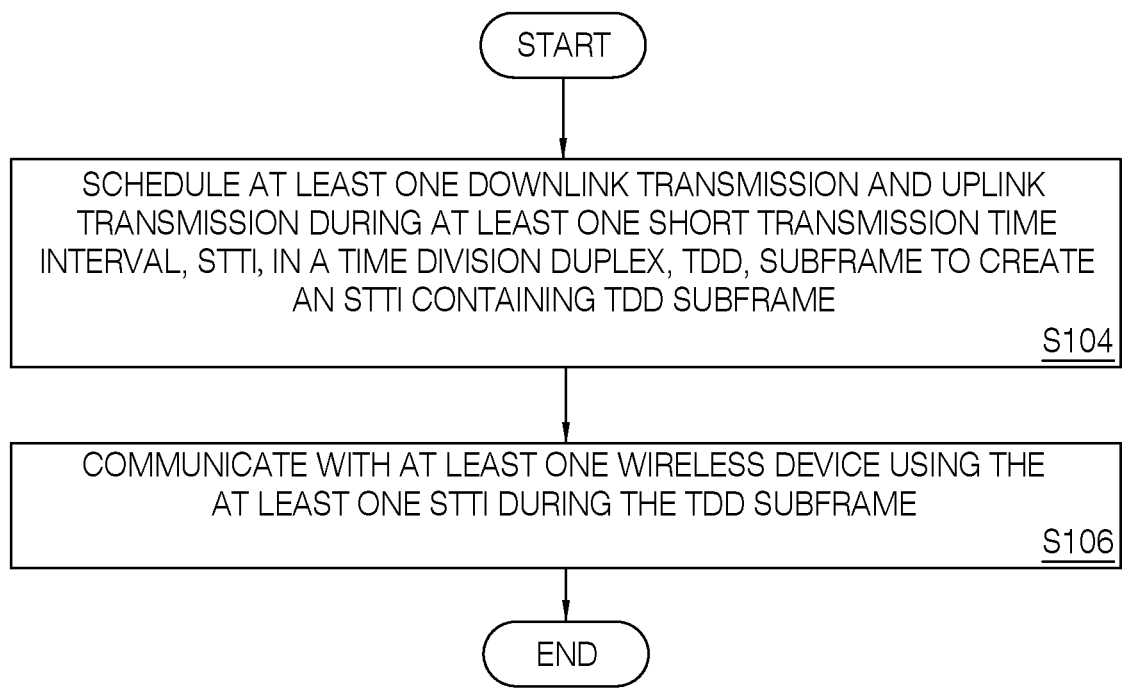
FIG. 7 is a flowchart of an exemplary process in a network node for communicating with a wireless device.

FIG. 7 is a flowchart of an exemplary process in a network node 40 for communicating with a wireless device 20. The process includes scheduling, via the TDD subframe scheduling unit 50, at least one of downlink transmissions and uplink transmissions during at least one sTTI in a TDD subframe to create an sTTI-containing TDD subframe (block S104). The process also includes communicating, via the transceiver 54, with the at least one wireless device 20 using the at least one sTTI during the TDD subframe (block S106)

Figure 8:
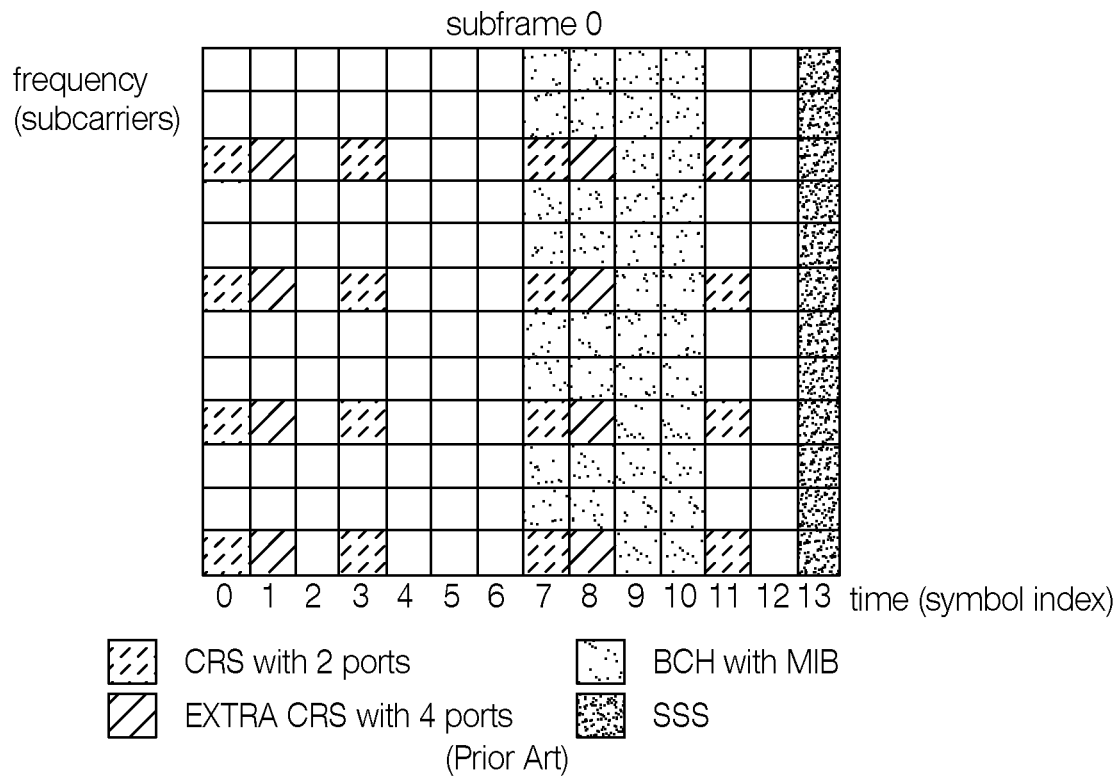
FIG. 8 illustrates SF0 in legacy FS2 with normal CP for both UL and DL in one resource block.

FIG. 8 illustrates SF0 in legacy FS2 with normal CP for both UL and DL in one resource block. As can be seen in FIG. 8, in order to avoid impact on a legacy wireless device's radio resource management (RRM) and channel state information (CSI) measurements, some symbols of SF0 are blocked for uplink sTTI transmissions. For example, some resource elements darkly shaded in symbol 0, 4, 7 and 11 of SF0 are reserved for CRS (Cell-Specific Reference Signals) to support two-antenna ports transmission (not in symbol 13). For symbols 1 and 8, four extra CRS (cross hatched) are allocated to different subcarriers to support a configuration with 4 antenna ports. The 72 center subcarriers on symbols 7, 8, 9, and 10 of SF0 are allocated for Broadcast Channel (BCH) to transmit the Master Information Block (MIB). The 72 center subcarriers on symbol 13 of SF0 are reserved for Secondary Synchronization Signals (SSS) transmission in TDD. In the following, we assume two-antenna ports for DL transmission.

Figure 9:
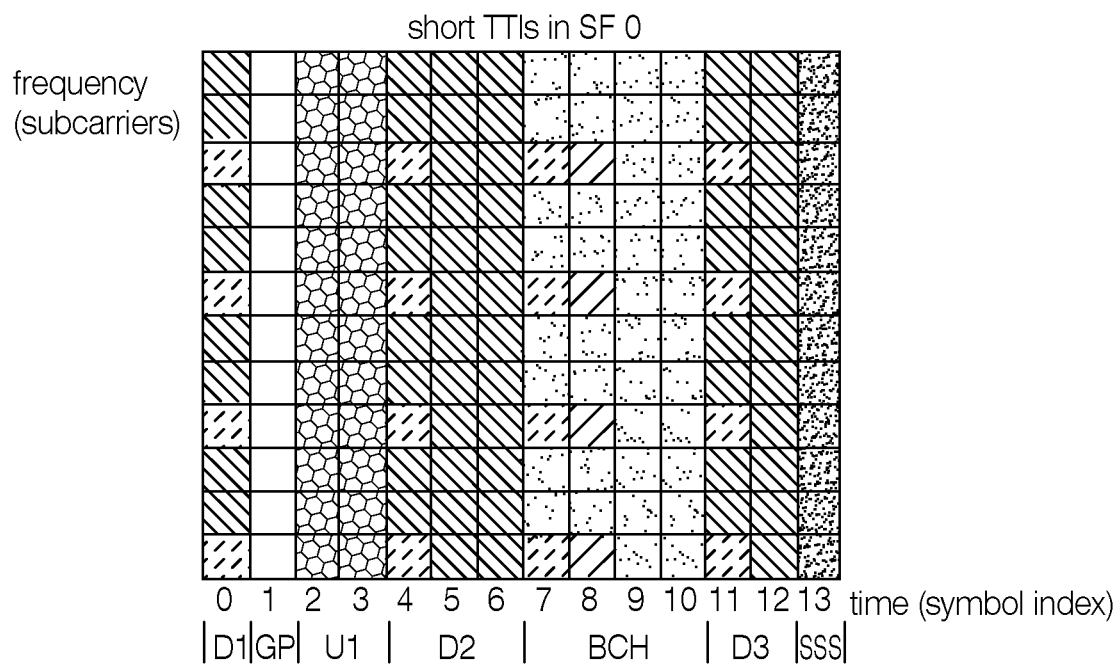
FIG. 9 illustrates an example of inserting 3 DL short TTIs and one UL short TTI on SF0.

UL short TTIs can be introduced on SF0, when a legacy wireless device is not scheduled for DL transmission on this SF. FIG. 9 illustrates an example of inserting 3 DL short TTIs and one UL short TTI on SF 0 assuming two antenna ports for DL transmission. Note that the DL TTIs include CRSs at distributed subcarriers. The various downlink TTIs are shaded differently, as are the BCH and SSS. The allocation of each symbol to a DL TTI, UL TTI, GP, BCH or SSS are labeled at the bottom of the figure below the subframe. For downlink, the sTTI frequency band containing at least one resource block (RB) that is used for SSS (symbol 13) and BCH (symbols 7, 8, 9 and 10) will have limitations on which symbols to use for short TTIs. For the symbols containing SSS or BCH, no part of the frequency bands can be used for uplink due to half duplex constraints in the eNodeB. In the following, "Di" and "Ui" denote the i-th short TTI in DL and UL, respectively. The first DL short TTI, i.e., D1 in FIG. 2, contains only one symbol (symbol 0), and is allocated to the physical downlink control channel (PDCCH) and may not be used for data transmission. Symbol 1 is used as a GP for switching from DL to UL. The uplink sTTI (U1) contains symbols 2 and 3. D2 contains symbols 4, 5 and 6. D3 contains symbols 11 and 12. Note that for symbols 0, 4, 7 and 11, 4 CRS are allocated to different subcarriers.

Figure 10:
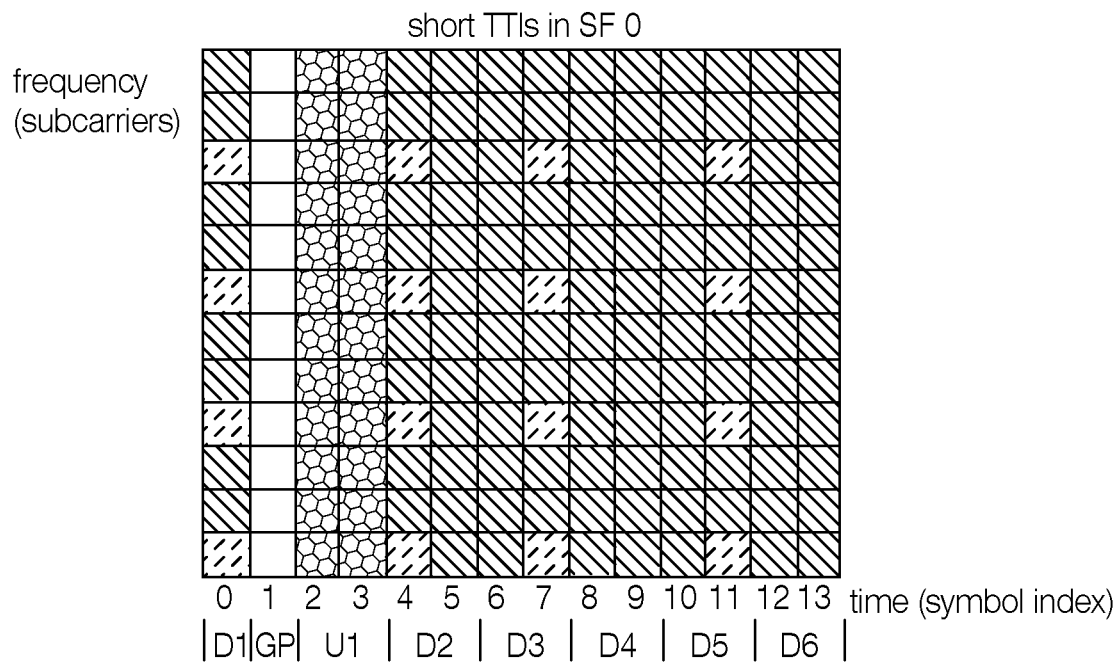
FIG. 10 illustrates an example of inserting 6 DL short TTIs and one UL short TTI on SF 0, when the short TTI frequency band does not contain the RBs that are used for secondary synchronization signal (SSS) and broadcast channel (BCH)

FIG. 10 illustrates an example of inserting 6 DL short TTIs and one UL short TTI on SF 0, when the sTTI frequency band does not contain the resource blocks (RBs) that are used for SSS and BCH. In this case, more DL short TTIs can be introduced in SF 0 as compared to the case shown in FIG. 2.

Figure 11:
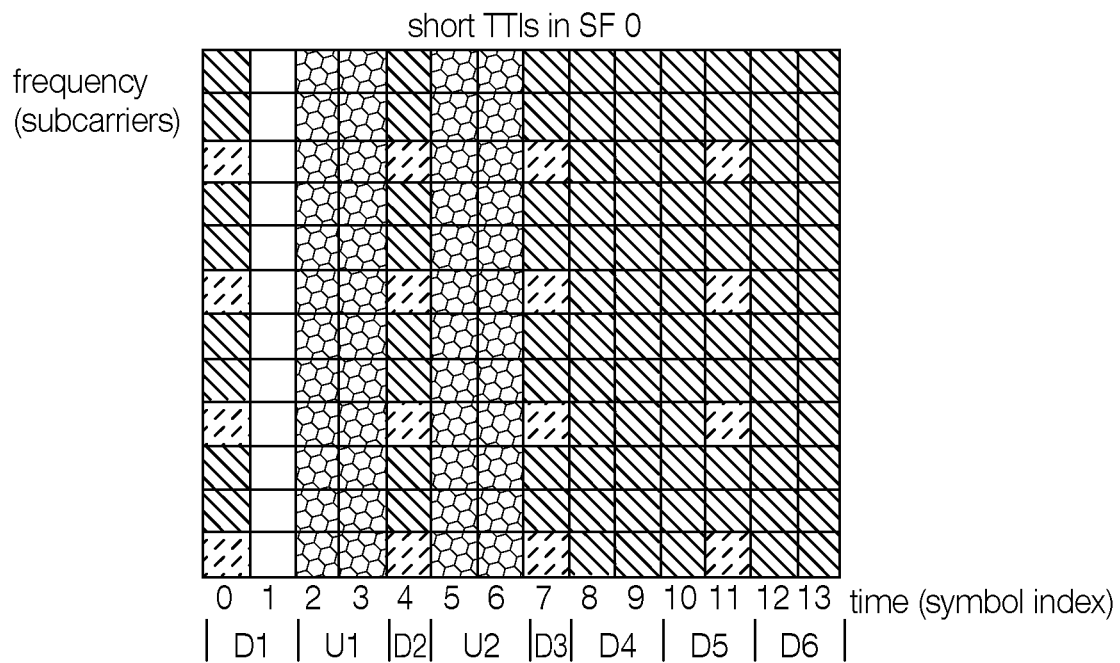
FIG. 11 illustrates an example of inserting 6 DL short TTIs and 2 UL short TTIs on SF5, when there is no GP needed for the switches from DL to UL.

If the DL-to-UL switch can be done within the cyclic prefix CP of one symbol, then the GP can be removed, which gives more opportunities for introducing UL short TTIs in a DL SF. FIG. 11 shows an example of inserting 6 DL short TTIs and 2 UL short TTIs on SF0, when there is no GP needed for the switches from DL to UL. In this example, the DL short TTIs, D2 and D3 have a single symbol length.

Figure 12:
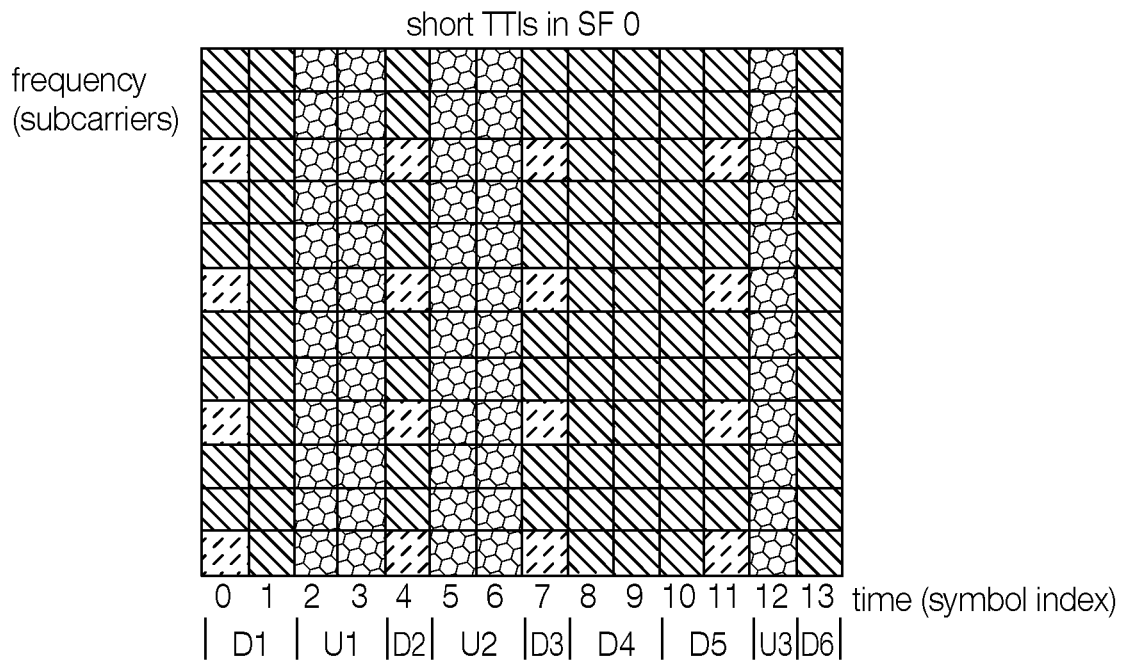
FIG. 12 illustrates and example of a UL short TTI having a single symbol length so that more UL sTTI can be inserted in SF 0.

If the UL short TTI can have a single symbol length, then more UL sTTI can be inserted in SF 0, as shown in FIG. 12.

Figure 13:
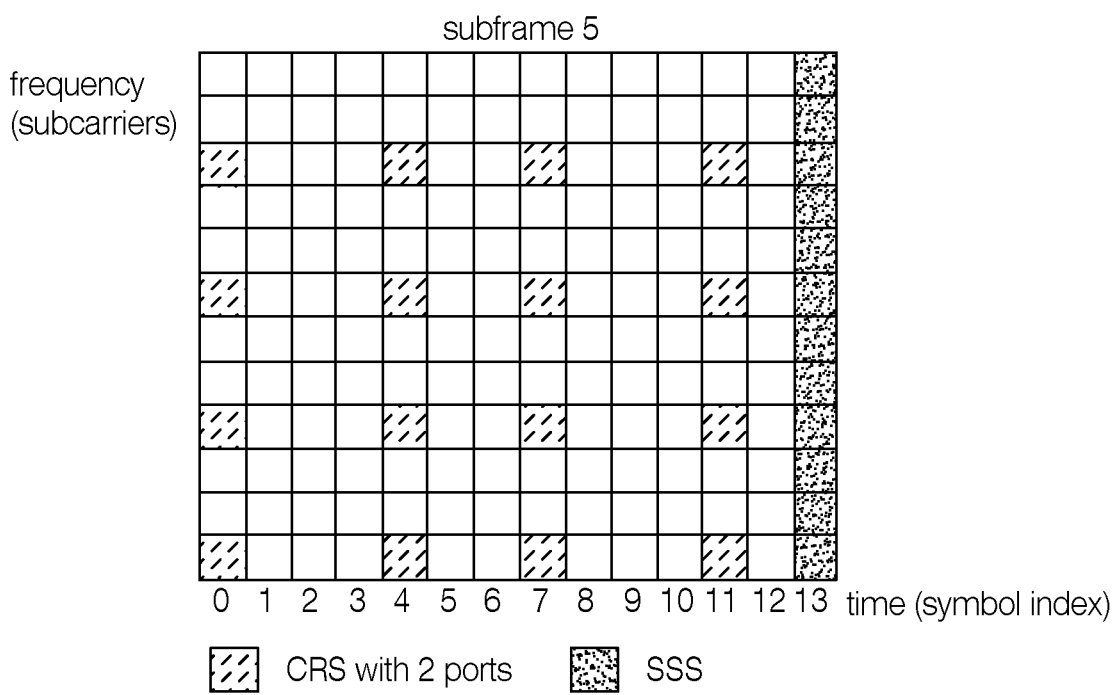
FIG. 13 illustrates SF5 in legacy FS2 with normal CP for both UL and DL in one resource block, when there is no System Information Block (SIB1) transmitted on this resource block.
Figure 14:
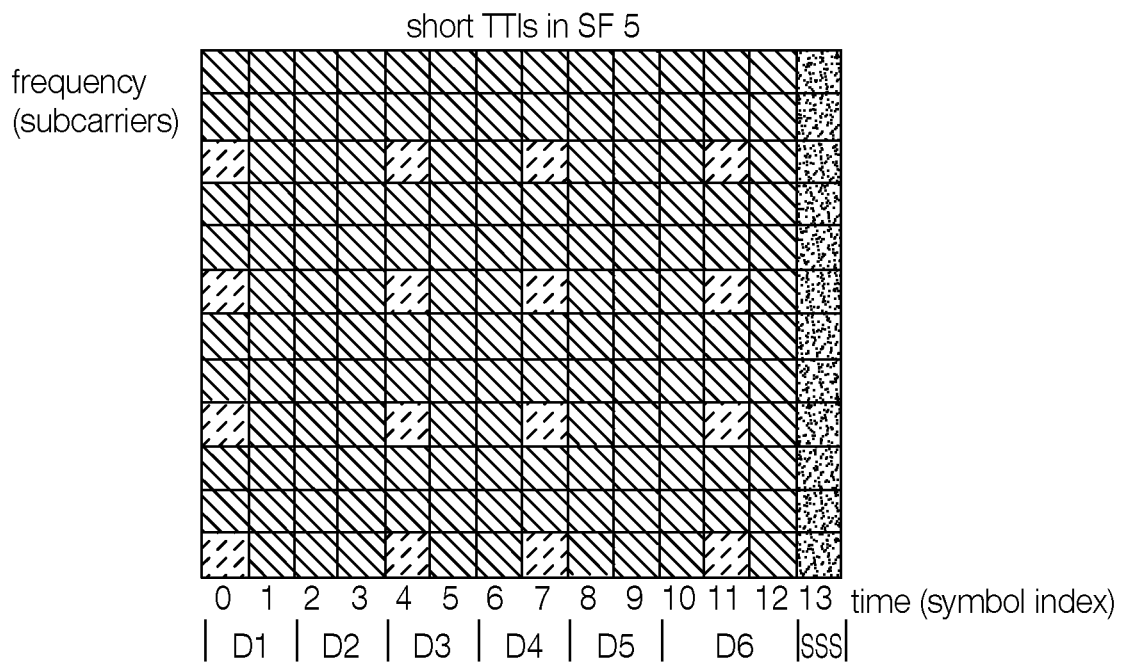
FIG. 14 illustrates an example of inserting 6 DL short TTIs on SF 5, when the short TTI frequency band contains at least one RB that is used for SSS.

FIG. 13 illustrates SF5 in legacy FS2 with normal CP for both UL and DL in one resource block, when there is no System Information Block (SIB1) transmitted on this resource block. Similar to FIG. 11, some resource elements in symbol 0, 4, 7 and 11 of SF 5 are reserved for CRS (Cell-Specific Reference Signals) to support two-antenna ports transmission. The 72 center subcarriers on symbol 13 of SF5 are reserved for Secondary Synchronization Signals (SSS) transmission in TDD.

Figure 15:
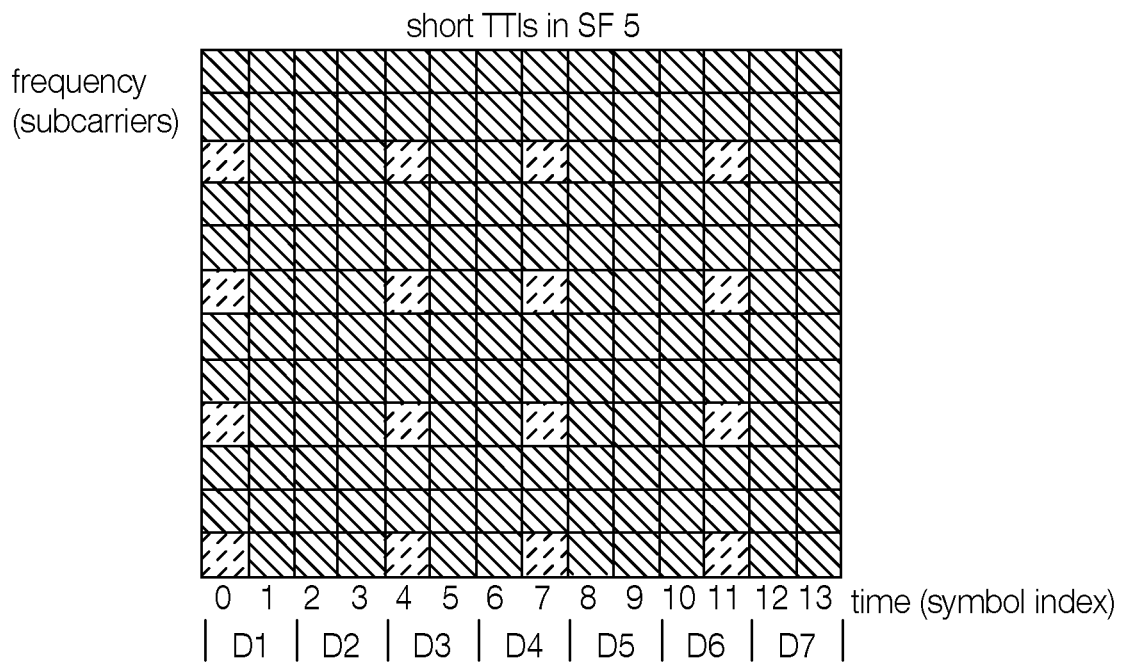
FIG. 15 illustrates the case where the short TTI band does not contain the RBs that are used for SSS, an example of inserting 7 DL 2-symbol short TTIs on SF 5.

When there is SIB1 transmission on SF5 and a GP is needed for a switch from DL to UL, only DL short TTIs can be introduced on SF5 on a different frequency band of that allocated for SIB1. While the BCH always covers the center 72 subcarriers, the SIB1 has a flexible bandwidth, which is signaled over PDCCH. FIG. 7 illustrates an example of inserting 6 DL short TTIs on SF 5, when the short TTI frequency band contains at least one RB that is used for SSS. For the case where the short TTI band does not contain the RBs that are used for SSS, an example of inserting 7 DL 2-symbol short TTIs on SF 5 is given in FIG. 15.

Figure 16:
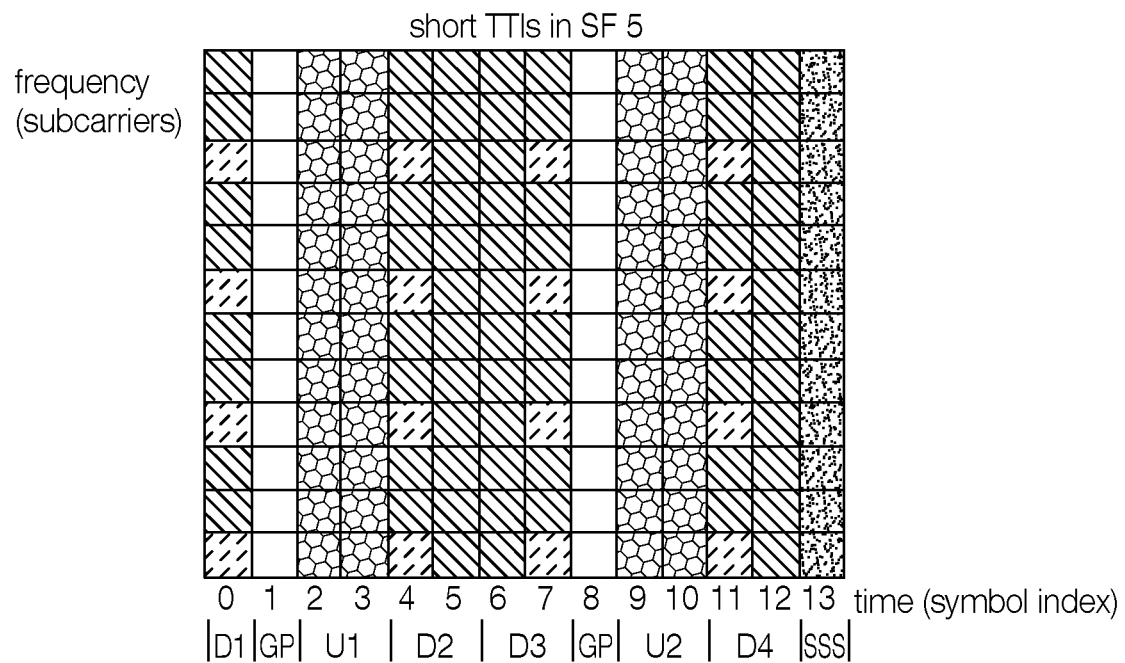
FIG. 16 illustrates an example of inserting 4 DL short TTIs and 2 UL short TTIs on SF 5, when the short TTI frequency band contains at least one RB that is used for SSS.

When there is no SIB1 transmission on SF5, up to two UL short TTIs of length 2 symbols can be introduced on SF5 by not scheduling legacy wireless devices for DL transmission on this SF. FIG. 16 illustrates an example of inserting 4 DL short TTIs and 2 UL short TTIs on SF 5, when the short TTI frequency band contains at least one RB that is used for SSS.

Figure 17:
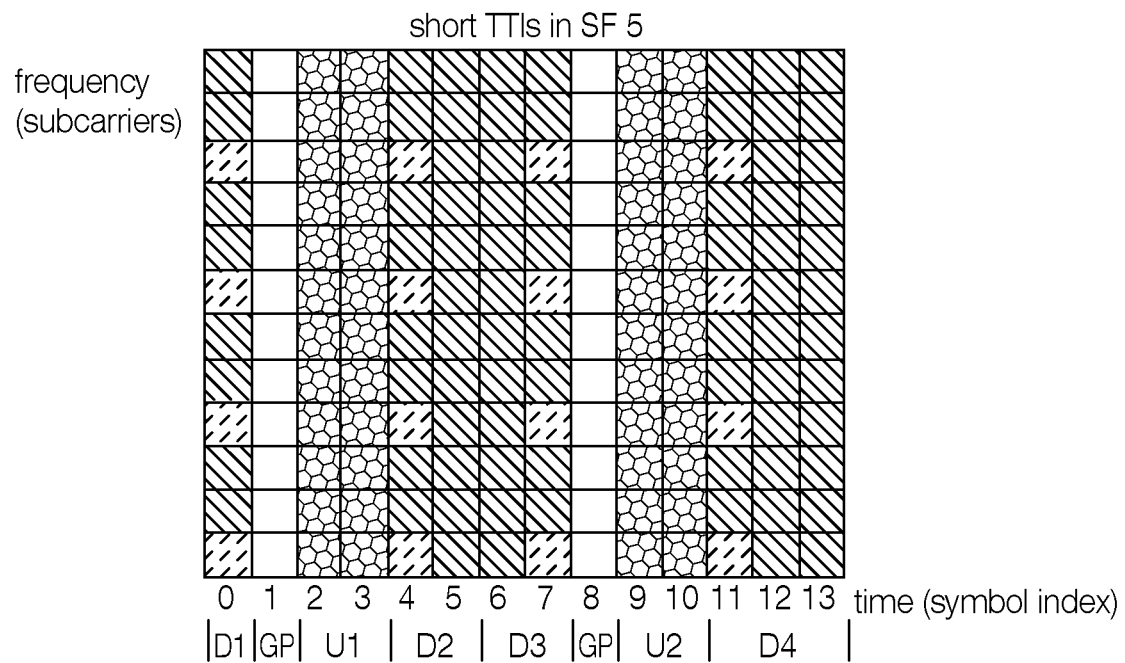
FIG. 17 illustrates an example of inserting 4 DL short TTIs and 2 UL short TTIs on SF 5.
Figure 18:
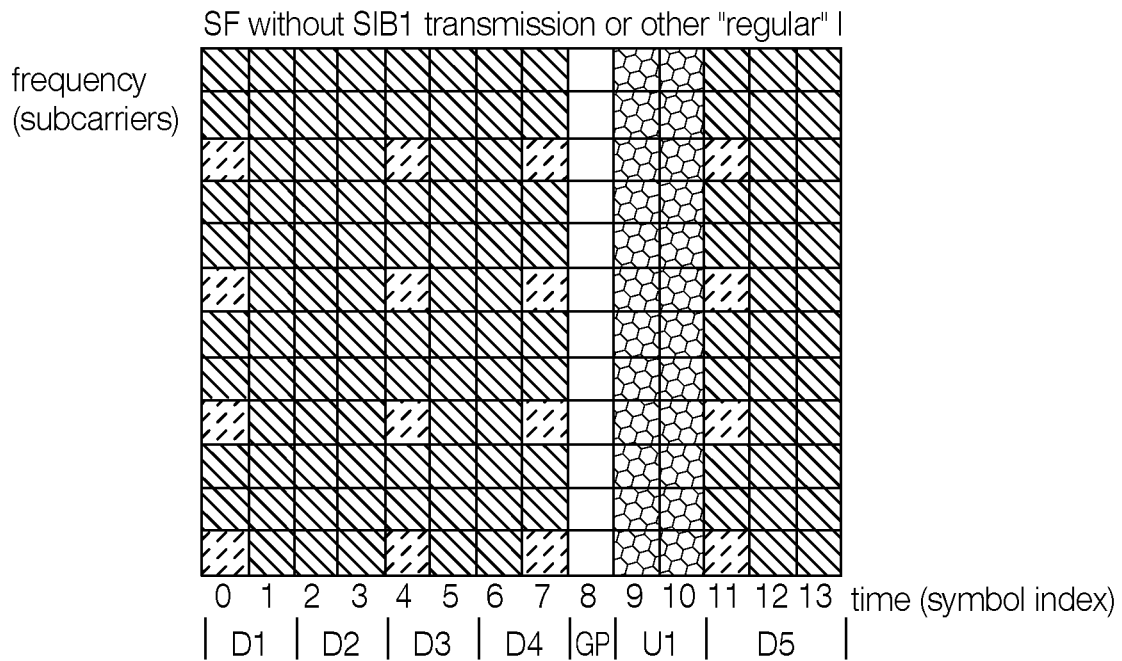
FIG. 18 illustrates an example of inserting 5 DL short TTIs and one UL short TTI on SF5.

For the case where the short TTI band does not contain the RBs that are used for SSS, FIG. 17 gives an example of inserting 4 DL short TTIs and 2 UL short TTIs on SF 5. FIG. 18 gives an example of inserting 5 DL short TTIs and one UL short TTI on SF5. The example given in FIG. 10 can also be applied on SF 5 to introduce one UL short TTI on symbols 2 and 3. Comparing to the example given in FIG. 10, the example of FIG. 18 maybe more flexible when a GP is needed for the switch from DL-to-UL. This is because symbol 1 is only available for GP when the PDCCH covers only a single symbol. If the example given in FIG. 18 is used, then there is still flexibility to freely choose the number of PDCCH symbols.

Figure 19:
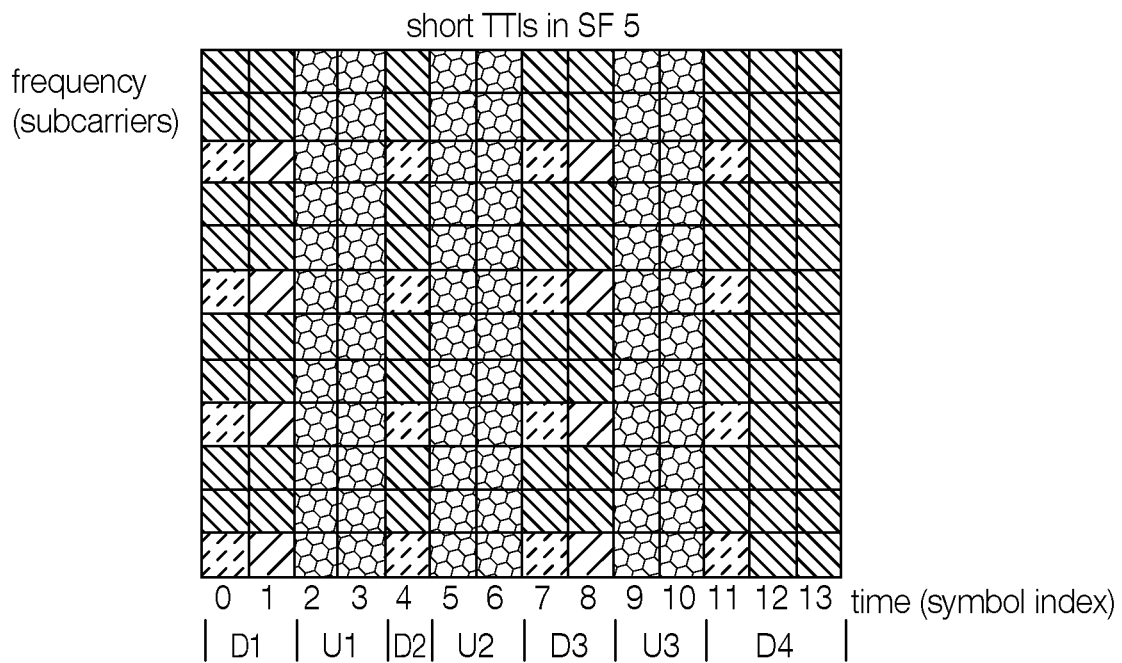
FIG. 19 illustrates an example of inserting 4 DL short TTIs and 3 UL short TTIs on SF5, considering 4 antenna ports for legacy DL transmission.
Figure 20:
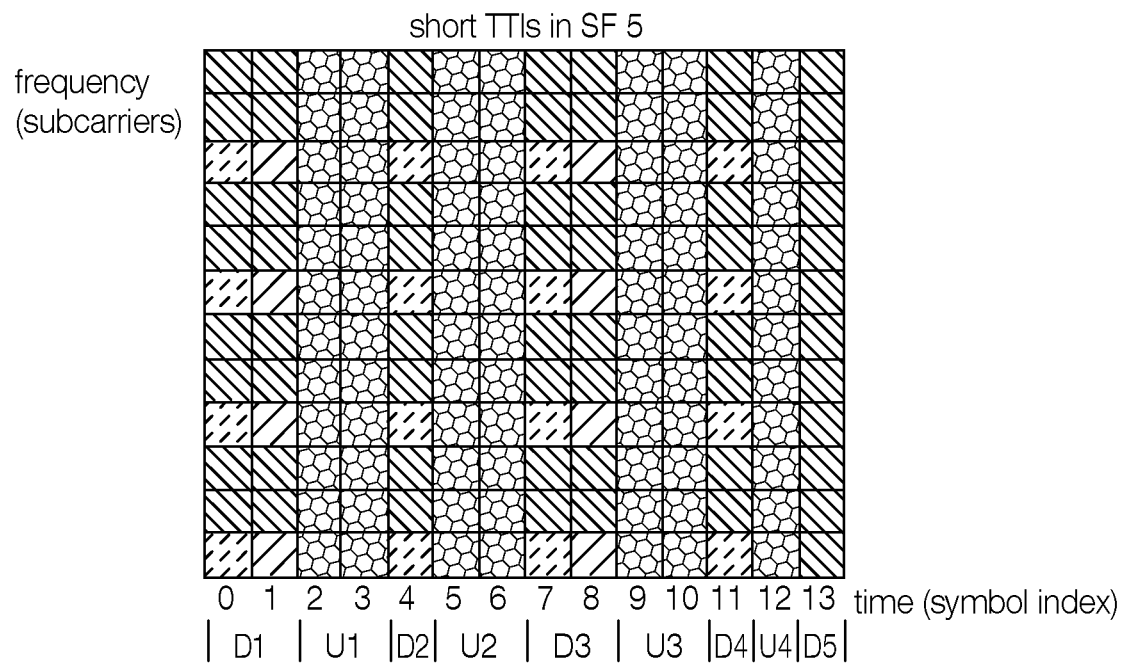
FIG. 20 illustrates an example of single-symbol length UL short TTI transmissions.

Assuming that the GP can be removed by switching from DL to UL within the CP of one symbol, FIG. 19 shows an example of inserting 4 DL short TTIs and 3 UL short TTIs on SF5, considering 4 antenna ports for legacy DL transmission. In this example, all the UL short TTIs have a fixed length of 2 symbols. If we allow for single-symbol length for UL short TTI transmissions, then symbol 12 of SF 5 can also be used for UL transmission, which is illustrated in FIG. 20.

For other DL SFs, introducing UL short TTIs should not affect the CRS transmission. Introducing UL short TTIs on other DL SFs follows the same methodology as described for the case of SF5 when there is no SIB1 transmission and the short TTI band does not contain the RBs for SSS, e.g., as shown in FIGS. 10, 17, 18, 19 and 20.

Figure 21:
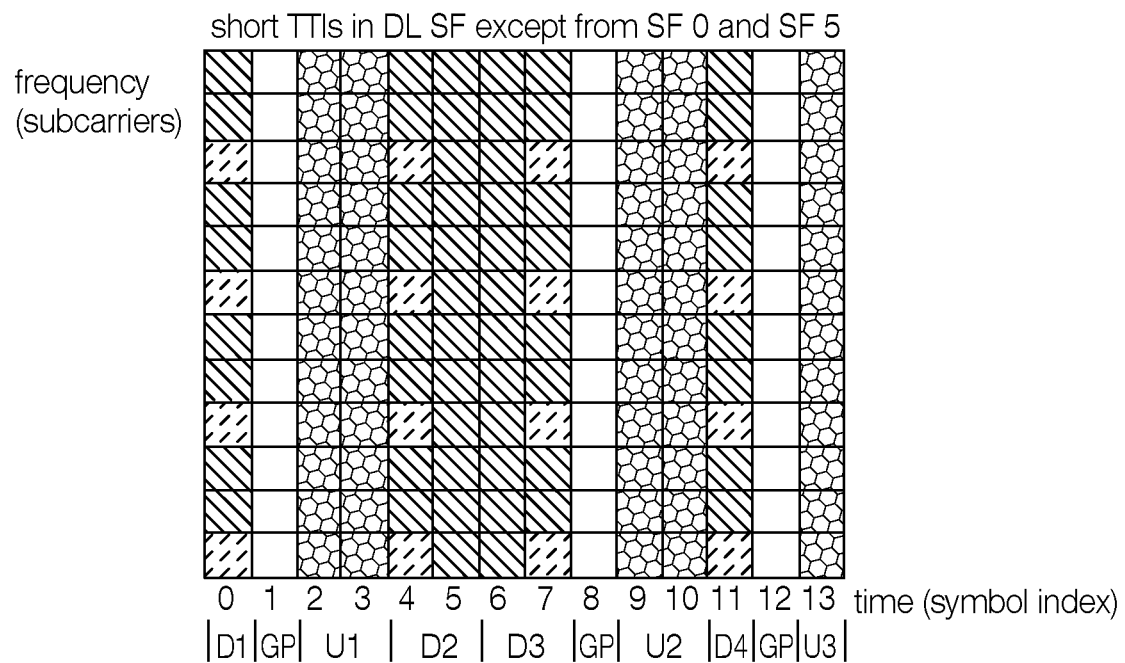
FIG. 21 illustrates an example of inserting 4 DL short TTIs and 3 UL short TTIs on SF5, when one symbol is reserved as a GP for the switch from DL to UL.
Figure 22:
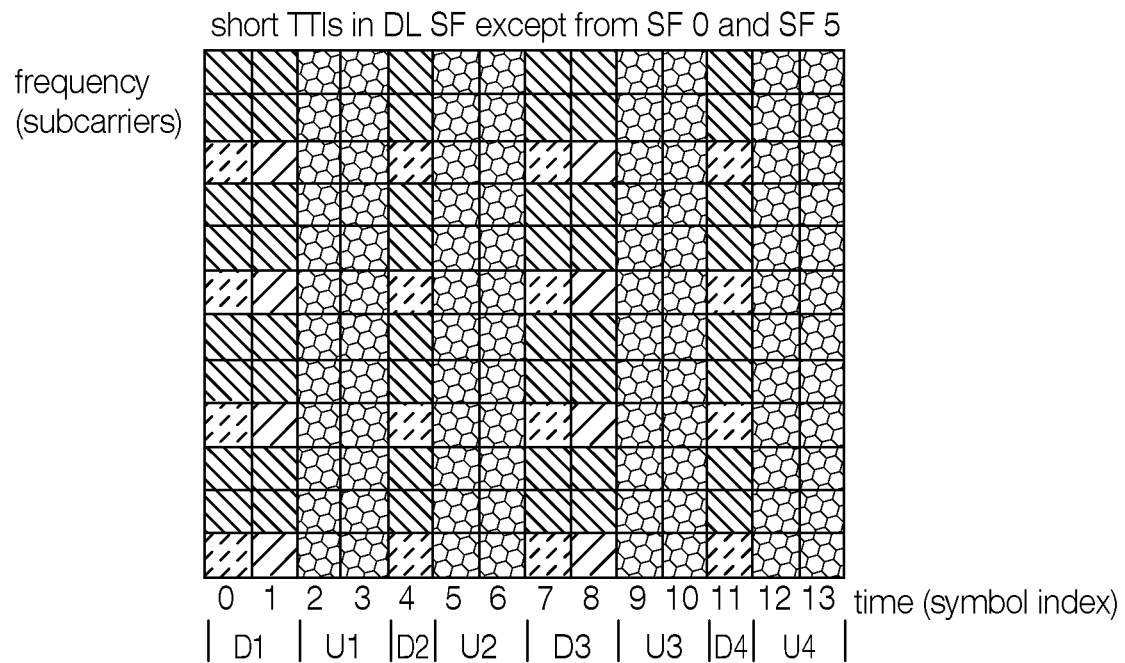
FIG. 22 illustrates an example of inserting 4 DL short TTIs and 4 UL short TTIs on SF5, when the DL to UL switch at the eNodeB can be done very fast within the CP of a symbol.

Since other DL SFs do not have SSS transmission in symbol 13, the last symbol of these SFs can also be used for UL short TTI transmissions. FIG. 21 shows an example of inserting 4 DL short TTIs and 3 UL short TTIs on SF5, when one symbol is reserved as a GP for the switch from DL to UL. As a variant of this solution, the first GP and U1 can instead be used for DL transmissions. U3 can be scheduled as a delayed part of U2 instead of a separate transmission. FIG. 22 shows an example of inserting 4 DL short TTIs and 4 UL short TTIs on SF5, when the DL to UL switch at the network node, e.g., base station, eNodeB, etc. can be done very fast, e.g., within the CP of a symbol.

If DL subframes are transmitted without CRS, the placement of UL short TTIs and GP within the DL subframe can be done more freely, such that they may cover also symbols 4, 7, and 11. The first symbols (depending on size of control region) should also in this case be used for DL sTTI.

The same methodology described above can also be used for introducing short TTIs on TDD UL SFs, which has much less constraints compared with introducing short TTIs on TDD DL SFs.

Figure 23:
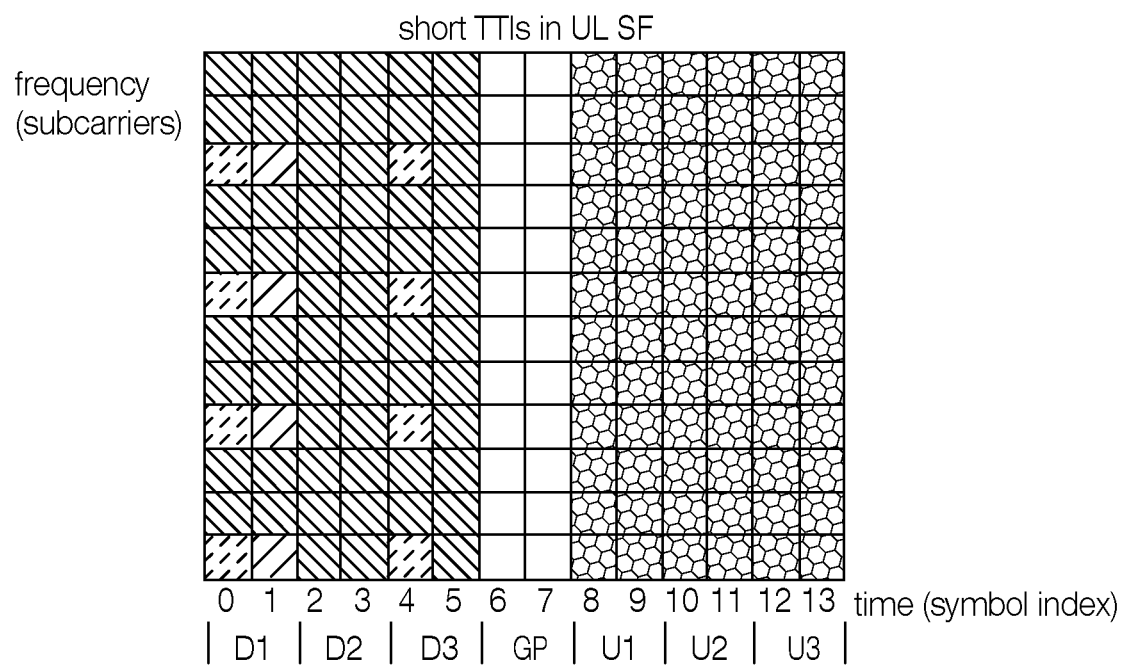
FIG. 23 illustrates an example of inserting short TTIs in a TDD UL SF when a legacy wireless device is not scheduled for UL transmission on this SF.
Figure 24:
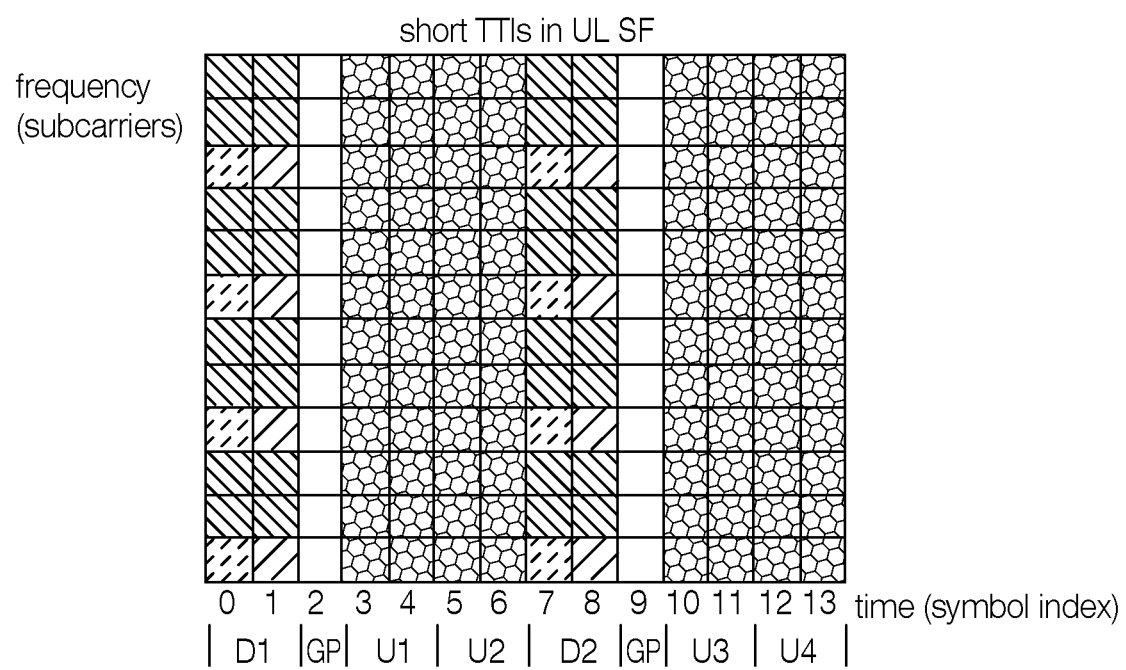
FIG. 24 illustrates another example of inserting short TTIs in a TDD UL SF when a legacy wireless device is not scheduled for UL transmission on this SF.

FIG. 23 and FIG. 24 are two examples of inserting short TTIs in a TDD UL SF, when a legacy wireless device is not scheduled for UL transmission on this SF. In these examples, the DL short TTIs reuse the legacy CRS pattern. This is beneficial since the wireless device can then reuse the existing implementation of channel estimation. But a new CRS pattern could be defined in the TDD UL SF, as no legacy wireless devices are dependent on CRS there. The configuration of the reference signals in the TDD UL SFs can be implicit, such that the wireless device knows positions of reference signals depending on the DL grant received. Alternatively, an explicit signaling is done of the reference signal configuration, for each UL TDD subframe. However, it should be pointed out that any RS pattern can be used for DL short TTIs in TDD UL SFs, since it will not have an impact on the legacy wireless devices.

Some embodiments include:

Embodiment 1

A method for use in a network node, such as a base station, in a wireless communication network, for communicating with at least one wireless device, the method comprising:

identifying at least one symbol of a time division duplex, TDD, subframe for allocation to a downlink short transmission time interval, TTI, the downlink short TTI having a duration less than a duration of the TDD subframe; and allocating the at least one symbol of the subframe to the downlink short TTI.

Embodiment 2

The method of Embodiment 1, further including transmitting information to the at least one wireless device using the downlink short TTI.

Embodiment 3

The method of Embodiment 1, wherein the TDD subframe is a legacy uplink TDD subframe.

Embodiment 4

The method of Embodiment 1, further comprising allocating a guard period symbol of the TDD subframe for switching from a downlink TTI to an uplink TTI.

Embodiment 5

The method of Embodiment 1, wherein a symbol of the TDD subframe not allocated to the downlink short TTI is allocated to a secondary synchronization signal, SSS, when the TDD subframe is a legacy downlink TDD subframe.

Embodiment 6

The method of Embodiment 1, wherein a plurality of symbols of the TDD subframe not allocated to the downlink short TTI are allocated to a broadcast channel, BCH, to transmit a master information block, MIB, when the TDD subframe is a legacy downlink TDD subframe.

Embodiment 7

A method in a wireless device, such as a user equipment, in a wireless communication system for transmitting information to a network node, such as a base station, the method comprising:
receiving from the network node information identifying at least one symbol of a time division duplex, TDD, subframe for allocation of an uplink short transmission time interval, TTI, the uplink short TTI having a duration less than a duration of the TDD subframe; and
allocating the at least one symbol of the TDD subframe to the uplink short TTI.

Embodiment 8

The method of Embodiment 7, further including transmitting information to the network node using the uplink short TTI.

Embodiment 9

The method of Embodiment 7, wherein the TDD subframe is a legacy downlink TDD subframe.

Embodiment 10

The method of Embodiment 7, further comprising allocating a guard period symbol of the TDD subframe for switching from a downlink transmission to an uplink transmission.

Embodiment 11

The method of Embodiment 7, wherein a symbol of the TDD subframe not allocated to the uplink short TTI is allocated to a secondary synchronization signal, SSS, when the TDD subframe is a legacy downlink TDD subframe.

Embodiment 12

The method of Embodiment 7, wherein a plurality of symbols of the TDD subframe not allocated to the uplink short TTI are allocated to a broadcast channel, BCH, to transmit a master information block, MIB, when the TDD subframe is a legacy downlink TDD subframe.

Embodiment 13

A network node configured for transmitting information to at least one wireless device, the network node comprising:
processing circuitry including a memory and a processor:
the memory configured to store a number of symbols to be allocated to a downlink short transmission time interval, TTI, to be inserted into a time division duplex, TDD, subframe; and
the processor configured to allocate the number of symbols to the downlink short TTI, the downlink short TTI having a duration less than a duration of the TDD subframe.

Embodiment 14

The network node of Embodiment 13, further comprising a transmitter configured to transmit information to the at least one wireless device using the downlink short TTI.

Embodiment 15

The network node of Embodiment 13, wherein the TDD subframe is a legacy uplink TDD subframe.

Embodiment 16

The network node of Embodiment 13, further comprising allocating a guard period symbol of the TDD subframe TDD subframe for switching from a downlink transmission to an uplink transmission.

Embodiment 17

The network node of Embodiment 13, wherein a symbol of the TDD subframe not allocated to the downlink short TTI is allocated to a secondary synchronization signal, SSS, when the TDD subframe is a legacy downlink TDD subframe.

Embodiment 18

The network node of Embodiment 13, wherein a plurality of symbols of the TDD subframe not allocated to the downlink short TTI are allocated to a broadcast channel, BCH, to transmit a master information block, MIB, when the TDD subframe is a legacy downlink TDD subframe.

Embodiment 19

A wireless device configured for transmitting information to a network node, the wireless device comprising:
processing circuitry including a memory and a processor:
the memory configured to store a number of symbols to be allocated to an uplink short transmission time interval, TTI, to be inserted into a time division duplex, TDD, subframe; and the processor configured to allocate the number of symbols to the uplink short TTI, the uplink short TTI having a duration less than a duration of the TDD subframe.

Embodiment 20

The network node of Embodiment 19, further comprising a transmitter configured to transmit using the uplink short TTI, information to the network node.

Embodiment 21

A network node configured for transmitting information to at least one wireless device, the network node comprising:
 a memory module configured to store a number of symbols to be allocated to a downlink short transmission time interval, TTI, to be inserted into a time division duplex, TDD, subframe; and
 an allocation module configured to allocate the number of symbols to the downlink short TTI, the downlink short TTI having a duration less than a duration of the TDD subframe.

Embodiment 22

The network node of Embodiment 21, further comprising a transmitter module configured to transmit information to the at least one wireless device using the downlink short TTI.

Embodiment 23

A wireless device configured for transmitting information to a network node, the wireless device comprising:
 a memory module configured to store a number of symbols to be allocated to an uplink short transmission time interval, TTI, to be inserted into a time division duplex, TDD, subframe; and
 an allocation module configured to allocate the number of symbols to the uplink short TTI, the uplink short TTI having a duration less than a duration of the TDD subframe.

Embodiment 24

The wireless device of Embodiment 23, further comprising a transmitter module configured to transmit information to the network node using the uplink short TTI.

Embodiment 25

A method for use in a network node, such as a base station, in a wireless communication network, for communicating with at least one wireless device, the method comprising:
 identifying at least one symbol of an uplink, UL, or downlink, DL, time division duplex, TDD, subframe for allocation to a short transmission time interval, TTI, the short TTI having a duration less than a duration of the subframe; and
 allocating the at least one symbol of the TDD subframe to the short TTI.

Embodiment 26

The method of Embodiment 25 wherein the TDD subframe is an uplink subframe and the short TTI is a DL short TTI.

Embodiment 27

The method of Embodiment 26 wherein the DL short TTI is used for transmitting information to the at least one wireless device.

Embodiment 28

The method of Embodiment 25 wherein the subframe is a downlink TDD subframe and the short TTI is an UL short TTI, and the method includes the further step of
 transmitting, to said at least one wireless device, information regarding which symbol(s) in the downlink TDD subframe to use for allocating UL short TTI.

Embodiment 29

The method of Embodiment 28 wherein the UL short TTI is used for receiving information from the at least one wireless device.

Embodiment 30

The method of Embodiment 25 wherein several of the symbols in the TDD subframe are used for allocation of short TTIs.

Embodiment 31

The method of embodiment 25, wherein the method reduces latency and HARQ RTT.

Embodiment 32

The method of embodiment 25, wherein method provides an enhanced radio frame structure type 2, applicable to TDD.

Embodiment 33

A method in a wireless device, such as a user equipment, in a wireless communication system for communicating with a network node, such as a base station, the method comprising:
 receiving, from the network node, information regarding at least one symbol in a downlink time division duplex, TDD, subframe to be used for allocating an uplink (UL) short transmission time interval (TTI), the UL short TTI having a duration less than a duration of the TDD subframe, and
 transmitting, using said UL short TTI(s), information to said network node.

Embodiment 34

A network node, such as a base station, in a wireless communication network, configured for communicating with at least one wireless device, the network node comprising:
 processing circuitry including a memory and a processor:
 the memory configured to store a number of symbols to be allocated to at least one of a downlink and an uplink short transmission time interval, TTI, to be inserted into a time division duplex, TDD, subframe;

the processor configured to:
identify at least one symbol of an uplink or downlink subframe for allocation to a short transmission time interval, TTI, the short TTI having a duration less than a duration of the TDD subframe; and
allocate the at least one symbol of the TDD subframe to the short TTI.

Embodiment 35

A wireless device, such as a user equipment, in a wireless communication system for communicating with a network node, such as a base station, the wireless device comprising:
processing circuitry including a memory and a processor:
the memory configured to store a number of symbols to be allocated to at least one of a downlink and an uplink short transmission time interval, TTI, to be inserted into a time division duplex, TDD, subframe;
the processor configured to:
receive, from the network node, information regarding at least one symbol in a downlink subframe to be used for allocating an uplink (UL) short transmission time interval (TTI), the UL short TTI having a duration less than a duration of the TDD subframe, and
transmit, using said UL short TTI(s), information to said network node.

Some embodiments advantageously provide methods, wireless devices and network nodes for communicating in a wireless communication network. In some embodiments, a wireless device 20 includes processing circuitry 22 configured to obtain information regarding the inclusion of at least one short transmission time interval, sTTI, in one of a time division duplex, TDD, uplink, UL, subframe and TDD downlink, DL, subframe of a radio frame. The wireless device 20 further includes a transceiver 34 configured to communicate with the network node 40 using the at least one sTTI during the TDD subframe.

In some embodiments, the TDD subframe is a TDD downlink subframe and transmission of uplink sTTIs in the TDD downlink subframe is performed only when no wireless devices not supporting sTTI transmissions are scheduled to transmit downlink in the TDD downlink subframe. In some embodiments, no uplink sTTIs are transmitted during symbols where the sTTI frequency band contains at least one resource block used for secondary synchronization signals, SSS. In some embodiments, the TDD downlink subframe is subframe 0 and no uplink sTTIs are transmitted in symbols where the sTTIs frequency band contains at least one resource block used for a broadcast channel, BCH. In some embodiments, the TDD downlink subframe is transmitted without cells specific reference symbols, CRS, and scheduling of uplink sTTIs in symbols 4, 7 and 11 are allowed. In some embodiments, the TDD subframe is a TDD uplink subframe and receiving of downlink sTTIs is only performed when no wireless devices not supporting sTTI transmission are scheduled to transmit on the uplink in the TDD uplink subframe. In some embodiments, the downlink sTTIs reuse a cell-specific reference symbol, CRS, pattern present in the TDD uplink subframe before the introduction of the sTTIs in the TDD subframe. In some embodiments, a guard period is removed by switching from downlink transmission to uplink transmission during the cyclic prefix of one symbol. In some embodiments, the processing circuitry further is further configured to allocate a guard period, GP, of the TDD subframe for switching from downlink signaling to uplink signaling. In some embodiments, the uplink transmissions occur during an sTTI having a duration of less than three symbols. In some embodiments, the downlink receptions occur during an sTTI having a duration of less than four symbols. In some embodiments, the TDD subframe is an uplink subframe and, when no other wireless device is scheduled for transmission during the TDD subframe, the uplink subframe is configured for downlink transmission during an sTTI having a duration not greater than two symbols. In some embodiments, the processing circuitry is further configured to form the TDD subframe having the sTTI.

In some embodiments, a method for use in a wireless device 20 in a wireless communication network 10 for communicating with at least one network node 40 is provided. The method includes obtaining information regarding the inclusion of at least one short transmission time interval, sTTI, in one of a time division duplex, TDD, uplink, UL, subframe and downlink, DL, subframe of a radio frame (block S100). The method further includes communicating with the network node 40 using the at least one sTTI during the TDD subframe (block S102).

In some embodiments, the TDD subframe is a TDD downlink subframe and transmission of uplink sTTIs in the TDD downlink subframe is performed only when no wireless devices not supporting sTTI transmissions are scheduled to transmit downlink in the TDD downlink subframe. In some embodiments, no uplink sTTIs are transmitted in symbols where the sTTI frequency band contains at least one resource block used for secondary synchronization signals, SSS. In some embodiments, the TDD downlink subframe is subframe 0 and no uplink sTTIs are transmitted in symbols where the sTTIs frequency band contains at least one resource block used for a broadcast channel, BCH. In some embodiments, the TDD downlink subframe is transmitted without cell-specific reference symbols, CRS, and transmissions of uplink sTTIs in symbols 4, 7 and 11 are allowed. In some embodiments, the TDD subframe is a TDD uplink subframe and receiving of downlink sTTIs is only performed when no wireless devices not supporting sTTI transmission are scheduled to transmit on the uplink in the TDD uplink subframe. In some embodiments, the downlink sTTIs reuse a cell-specific reference symbol, CRS, pattern present in the TDD uplink subframe before the introduction of the sTTIs in the TDD subframe. In some embodiments, a guard period is removed by switching from downlink transmission to uplink transmission during the cyclic prefix of one symbol. In some embodiments, the method further includes allocating a guard period, GP, of the TDD subframe for switching from downlink signaling to uplink signaling. In some embodiments, the TDD subframe is a downlink subframe configured to include at least one uplink sTTI. In some embodiments, the uplink transmissions occur during an sTTI having a duration less than three symbols. In some embodiments, the downlink receptions occur during an sTTI having a duration less than four symbols. In some embodiments, the TDD subframe is an uplink subframe and, when no other wireless device 20 is scheduled for transmission during the TDD subframe, the uplink subframe is configured for downlink transmissions during an sTTI having a duration not greater than two symbols. In some embodiments, the method further includes forming the TDD subframe having the sTTI.

In some embodiments, a wireless device 20 in a wireless communication network 10 for communicating with a network node 40 is provided. The wireless device 20 includes a time division duplex, TDD, subframe module 31 configured to obtain information regarding the inclusion of at least one short transmission time interval, sTTI, in one of a time division duplex, TDD, uplink, UL, subframe and downlink, DL, subframe of a radio frame. The wireless device 20 also includes a transceiver module 35 configured to communicate with the network node 40 using the at least one sTTI during the TDD subframe.

In some embodiments, a network node 40 for use in a wireless communication network 10 for communicating with at least one wireless device 20 is provided. The network node 40 includes processing circuitry 42 configured to schedule at least one of downlink transmissions and uplink transmissions during at least one short transmission time interval, sTTI, in a time division duplex, TDD, subframe. The network node 40 also includes a transceiver 54 configured to communicate with the at least one wireless device 20 using the at least one sTTI during the TDD subframe.

In some embodiments, the TDD subframe is a TDD downlink subframe and scheduling of uplink sTTIs in the TDD downlink subframe is performed only when no wireless devices not supporting sTTI transmissions are scheduled to transmit downlink in the TDD downlink subframe. In some embodiments, no uplink sTTIs are scheduled in symbols where the sTTI frequency band contains at least one resource block used for secondary synchronization signals, SSS. In some embodiments, the TDD downlink subframe is subframe 0 and no uplink sTTIs are scheduled in symbols where the sTTIs frequency band contains at least one resource block used for a broadcast channel, BCH. In some embodiments, the TDD downlink subframe is transmitted without cell-specific reference symbol, CRS, and scheduling of uplink sTTIs in symbols 4, 7 and 11 are allowed. In some embodiments, the TDD subframe is a TDD uplink subframe and scheduling of downlink sTTIs is only performed when no wireless devices not supporting sTTI transmission are scheduled to transmit on the uplink in the TDD uplink subframe. In some embodiments, the downlink sTTIs reuse a cell-specific reference symbol, CRS, pattern present in the TDD uplink subframe before the introduction of the sTTIs in the TDD subframe. In some embodiments, a guard period is removed by switching from downlink transmission to uplink transmission during the cyclic prefix of one symbol. In some embodiments, the processing circuitry is further configured to allocate a guard period, GP, of the TDD subframe for switching from a downlink sTTI to an uplink sTTI. In some embodiments, a symbol of the TDD subframe not allocated to a short TTI is allocated to a secondary synchronization signal, SSS. In some embodiments, the uplink transmissions occur during an sTTI having a duration less than three symbols. In some embodiments, the downlink transmissions occur during an sTTI having a duration less than four symbols. In some embodiments, the TDD subframe includes a first symbol allocated to physical downlink control channel, PDCCH, signaling. In some embodiments, scheduling the TDD subframe includes scheduling a broadcast channel, BCH, having a duration of no more than four symbols. In some embodiments, the TDD subframe is an uplink TDD subframe and the scheduling includes, when no wireless device not configured to transmit sTTI signaling is scheduled for transmission during the TDD subframe, scheduling at least one downlink sTTI having a duration not greater than two symbols.

In some embodiments, a method for use in a network node 40 in a wireless communication network 10 for communicating with at least one wireless device 20 is provided. The method includes scheduling at least one of downlink transmissions and uplink transmissions during at least one short transmission time interval, sTTI, in a time division duplex, TDD, subframe (block S104). The method includes communicating with the at least one wireless device 20 using the at least one sTTI during the TDD subframe (block S106).

In some embodiments, the TDD subframe is a TDD downlink subframe and scheduling of uplink sTTIs in the TDD downlink subframe is performed only when no wireless devices not supporting sTTI transmissions are scheduled to transmit downlink in the TDD downlink subframe. In some embodiments, no uplink sTTIs are scheduled in symbols where the sTTI frequency band contains at least one resource block used for secondary synchronization signals, SSS. In some embodiments, the TDD downlink subframe is subframe 0 and no uplink sTTIs are scheduled in symbols where the sTTIs frequency band contains at least one resource block used for a broadcast channel, BCH. In some embodiments, the TDD downlink subframe is transmitted without cell-specific reference symbols, CRS, and scheduling of uplink sTTIs in symbols 4, 7 and 11 are allowed. In some embodiments, the TDD subframe is a TDD uplink subframe and scheduling of downlink sTTIs is only performed when no wireless devices not supporting sTTI transmission are scheduled to transmit on the uplink in the TDD uplink subframe. In some embodiments, the downlink sTTIs reuse a cell-specific reference symbol, CRS, pattern present in the TDD subframe before the introduction of the sTTIs in the TDD uplink subframe. In some embodiments, a guard period is removed by switching from downlink transmission to uplink transmission during the cyclic prefix of one symbol. In some embodiments, the method further includes allocating a guard period, GP, of the TDD subframe for switching from a downlink sTTI to an uplink sTTI. In some embodiments, a symbol of the TDD subframe not allocated to a short TTI is allocated to a secondary synchronization signal, SSS. In some embodiments, the uplink transmissions occur during an sTTI having a duration less than three symbols. In some embodiments, the downlink transmissions occur during an sTTI having a duration less than four symbols. In some embodiments, the TDD subframe includes a first symbol allocated to physical downlink control channel, PDCCH, signaling. In some embodiments, scheduling the TDD subframe includes scheduling a broadcast channel, BCH, having a duration of no more than four symbols. In some embodiments, the TDD subframe is an uplink TDD subframe and the scheduling includes, when no wireless device not configured to transmit sTTI signaling is scheduled for transmission during the TDD subframe, scheduling at least one downlink sTTI having a duration not greater than two symbols.

In some embodiments, a network node 40 for scheduling data signaling in a wireless communication network 10 is provided. The network node 40 includes a time division duplex, TDD, subframe scheduling module 51 configured to schedule at least one of downlink transmissions and uplink transmissions during at least one short transmission time interval, sTTI, in a time division duplex, TDD, subframe. The network node 40 further includes a transceiver module 55 configured to communicate with the at least one wireless device 20 using the at least one sTTI during the TDD subframe.

ABBREVIATION EXPLANATION

BCH Broadcast Channel
BLER Block Error Rate
CP Cyclic Prefix
DL Downlink
FS Frame Structure
GP Guard Period LTE Long Term Evolution
MIB Master Information Block
OFDM Orthogonal Frequency Division Multiplexing
RE Resource Element
RTT Round Trip Time
SC-FDMA Single Carrier-Frequency Division Multiple Access
SF Subframe
TTI Transmission Time Interval
SSS Secondary Synchronization Signals
UL Uplink As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device in a wireless communication network for communicating with at least one network node, the wireless device comprising:
   processing circuitry configured to obtain information from the network node regarding the inclusion of at least one short transmission time interval, sTTI, in one of a time division duplex, TDD, uplink, UL, subframe and TDD downlink, DL, subframe of a radio frame to create an sTTI containing TDD subframe for at least one of UL transmissions and DL transmissions; and
   a transceiver configured to communicate with the network node using the at least one sTTI during the TDD subframe,
   wherein a part of the DL subframe is used for UL sTTI transmissions and a part of the UL subframe is used for DL sTTI transmissions.

2. The wireless device of claim 1, wherein the TDD subframe is a TDD downlink subframe and transmission of uplink sTTIs in the TDD downlink subframe is performed only when no wireless devices not supporting sTTI transmissions are scheduled to receive downlink transmissions in the TDD downlink subframe.

3. The wireless device of claim 1, wherein no uplink sTTIs are transmitted during symbols where the sTTI frequency band contains at least one resource block used for secondary synchronization signals, SSS.

4. The wireless device of claim 2, wherein the TDD downlink subframe is subframe 0 and no uplink sTTIs are transmitted in symbols where the sTTIs frequency band contains at least one resource block used for a broadcast channel, BCH.

5. The wireless device of claim 2, wherein the TDD downlink subframe is transmitted without cell-specific reference signals, CRS, and scheduling of uplink sTTIs in symbols 4, 7 and 11 are allowed.

6. The wireless device of claim 1, wherein the TDD subframe is a TDD uplink subframe and receiving of downlink sTTIs is only performed when no wireless devices not supporting sTTI transmission are scheduled to transmit on the uplink in the TDD uplink subframe.

7. The wireless device of claim 6, wherein the downlink sTTIs reuse a cell-specific reference signal, CRS, pattern present in the TDD uplink subframe before the introduction of the sTTIs in the TDD subframe.

8. The wireless device of claim 1, wherein a guard period is removed by switching from downlink transmission to uplink transmission during the cyclic prefix of one symbol.

9. The wireless device of claim 1, further comprising allocating a guard period, GP, of the TDD subframe for switching from downlink signaling to uplink signaling.

10. The wireless device of claim 2, wherein the uplink transmissions occur during an sTTI having a duration of less than three symbols.

11. The wireless device of claim 1, wherein downlink receptions occur during an sTTI having a duration of less than four symbols.

12. The wireless device of claim 1, wherein the TDD subframe is an uplink subframe and, when no other wireless device is scheduled for transmission during the TDD subframe, the uplink subframe is configured for downlink transmission during an sTTI having a duration not greater than two symbols.

13. The wireless device of claim 1, wherein the processing circuitry is further configured to form the TDD subframe having the sTTI.

14. A method for use in a wireless device in a wireless communication network for communicating with at least one network node, the method comprising:
    obtaining information from the network node regarding the inclusion of at least one short transmission time interval, sTTI, in one of a time division duplex, TDD, uplink, UL, subframe and downlink, DL, subframe of a radio frame to create an sTTI containing TDD subframe for at least one of UL transmissions and DL transmissions; and
    communicating with the network node using the at least one sTTI during the TDD subframe,
    wherein a part of the DL subframe is used for UL sTTI transmissions and a part of the UL subframe is used for DL sTTI transmissions.

15. The method of claim 14, wherein the TDD subframe is a downlink subframe configured to include at least one uplink sTTI.

16. A network node for use in a wireless communication network for communicating with at least one wireless device, the network node comprising:
    processing circuitry configured to schedule at least one of downlink transmissions and uplink transmissions during at least one short transmission time interval, sTTI, in a time division duplex, TDD, subframe, wherein the TDD subframe is at least one of a TDD downlink (DL) subframe and a TDD uplink (UL) subframe; and
    a transceiver configured to communicate with the at least one wireless device using the at least one sTTI during the TDD subframe,
    wherein a part of the DL subframe is used for UL sTTI transmissions and a part of the UL subframe is used for DL sTTI transmissions.

17. The network node of claim 16, wherein the TDD subframe is a TDD downlink subframe and scheduling of uplink sTTIs in the TDD downlink subframe is performed only when no wireless devices not supporting sTTI transmissions are scheduled to receive downlink transmissions in the TDD downlink subframe.

18. The network node 404 of claim 17, wherein no uplink sTTIs are scheduled in symbols where the sTTI frequency band contains at least one resource block used for secondary synchronization signals, SSS.

19. The network node of claim 17, wherein the TDD downlink subframe is subframe 0 and no uplink sTTIs are scheduled in symbols where the sTTIs frequency band contains at least one resource block used for a broadcast channel, BCH.

20. The network node of claim 17, wherein the TDD downlink subframe is transmitted without cell-specific reference signal, CRS, and scheduling of uplink sTTIs in symbols 4, 7 and 11 are allowed.

21. The network node of claim 17, wherein the TDD subframe is a TDD uplink subframe and scheduling of downlink sTTIs is only performed when no wireless devices not supporting sTTI transmission are scheduled to transmit on the uplink in the TDD uplink subframe.

22. The network node of claim 21, wherein the downlink sTTIs reuse a cell-specific reference signal, CRS, pattern present in the TDD uplink subframe before the introduction of the sTTIs in the TDD subframe.

23. The network node of claim 17, wherein a guard period is removed by switching from downlink transmission to uplink transmission during the cyclic prefix of one symbol.

24. The network node of claim 17, further comprising allocating a guard period, GP, of the TDD subframe for switching from a downlink sTTI to an uplink sTTI.

25. The network node of claim 17, wherein a symbol of the TDD subframe not allocated to a short TTI is allocated to a secondary synchronization signal, SSS.

26. The network node of claim 25, wherein the uplink transmissions occur during an sTTI having a duration less than three symbols.

27. The network node of claim 17, wherein the downlink transmissions occur during an sTTI having a duration less than four symbols.

28. The network node of claim 27, wherein the TDD subframe includes a first symbol allocated to physical downlink control channel, PDCCH, signaling.

29. The network node of claim 17, wherein forming the TDD subframe includes scheduling a broadcast channel, BCH, having a duration of no more than four symbols.

30. The network node of claim 16, wherein the TDD subframe is an uplink TDD subframe and the scheduling includes, when no wireless device not configured to transmit sTTI signaling is scheduled for transmission during the TDD subframe, scheduling at least one downlink sTTI having a duration not greater than two symbols.

31. A method for use in a network node in a wireless communication network for communicating with at least one wireless device, the method comprising:
    scheduling at least one of downlink transmissions and uplink transmissions during at least one short transmission time interval, sTTI, in a time division duplex, TDD, subframe, wherein the TDD subframe is at least one of a TDD downlink (DL) subframe and a TDD uplink (UL) subframe; and communicating with the at least one wireless device using the at least one sTTI during the TDD subframe, wherein a part of the DL subframe is used for performing UL sTTI transmissions and a part of the UL subframe is used for performing DL sTTI transmissions.

\* \* \* \* \*